United States Patent
Kulkarni et al.

(10) Patent No.: US 11,485,278 B2
(45) Date of Patent: Nov. 1, 2022

(54) SYSTEM AND METHOD FOR ADAPTIVE DRIVING BEAM HEADLAMP

(71) Applicant: Grote Industries, LLC, Madison, IN (US)

(72) Inventors: Suyash Kulkarni, Madison, IN (US); Sankalp Pampattiwar, Madison, IN (US); Brian Norris, Madison, IN (US); Cesar Perez-Bolivar, Madison, IN (US)

(73) Assignee: Grote Industries, LLC, Madison, IN (US)

( * ) Notice: Subject to any disclaimer, the term of this patent is extended or adjusted under 35 U.S.C. 154(b) by 16 days.

(21) Appl. No.: 17/090,233

(22) Filed: Nov. 5, 2020

(65) Prior Publication Data

US 2021/0291722 A1    Sep. 23, 2021

Related U.S. Application Data

(62) Division of application No. 16/822,723, filed on Mar. 18, 2020, now Pat. No. 11,390,209.

(51) Int. Cl.
*B60Q 1/14* (2006.01)
*G01S 13/88* (2006.01)
*G01S 13/08* (2006.01)

(52) U.S. Cl.
CPC .............. *B60Q 1/143* (2013.01); *G01S 13/08* (2013.01); *G01S 13/88* (2013.01); *B60Q 2300/42* (2013.01)

(58) Field of Classification Search
None
See application file for complete search history.

(56) References Cited

U.S. PATENT DOCUMENTS

| | | | | |
|---|---|---|---|---|
| 5,837,994 A * | 11/1998 | Stam | ...................... | H04N 5/335 250/214 D |
| 5,990,469 A * | 11/1999 | Bechtel | ................ | B60Q 1/1423 348/E3.02 |
| 6,049,171 A * | 4/2000 | Stam | ...................... | B60Q 1/085 250/2 UAL |
| 6,097,023 A * | 8/2000 | Schofield | ............. | B60Q 1/1423 348/E7.086 |
| 6,281,632 B1 * | 8/2001 | Stam | ...................... | B60Q 1/085 250/2 UAL |
| 6,429,594 B1 * | 8/2002 | Stam | ...................... | B60Q 1/18 250/2 UAL |

(Continued)

*Primary Examiner* — Srinivas Sathiraju
(74) *Attorney, Agent, or Firm* — Posz Law Group, PLC

(57) ABSTRACT

A lighting system for a local vehicle, comprising: a head lamp including a low-beam lamp for shining low-beam light in a first zone, and a first high-beam lamp for shining first high-beam light in the first zone; a sensory cluster for detecting a remote vehicle proximate to the local vehicle, the sensory cluster including a distance sensor for determining a distance of the remote vehicle from the local vehicle, and a velocity sensor for determining a velocity of the remote vehicle with respect to the local vehicle; and a lighting controller for determining a minimum-distance target time when the remote vehicle will reach a minimum distance from the local vehicle based on the distance of the remote vehicle and the velocity of the remote vehicle, and for controlling the operation of the first high-beam lamp based on the distance of the remote vehicle and the velocity of the remote vehicle.

9 Claims, 10 Drawing Sheets

(56) References Cited

U.S. PATENT DOCUMENTS

| | | | | |
|---|---|---|---|---|
| 7,298,314 | B2* | 11/2007 | Schantz | G01S 5/14 |
| | | | | 342/125 |
| 9,721,172 | B2* | 8/2017 | Wright | G06V 20/584 |
| 9,738,215 | B2* | 8/2017 | Hoffmann | B60Q 1/143 |
| 9,791,766 | B2* | 10/2017 | Ekin | G08G 1/054 |
| 9,878,662 | B2* | 1/2018 | Carlesimo | B60Q 3/80 |
| 9,946,734 | B2* | 4/2018 | Ekin | G06V 20/56 |
| 10,032,753 | B2* | 7/2018 | Jones | H01L 25/0753 |
| 10,252,662 | B2* | 4/2019 | Hoffmann | B60Q 1/143 |
| 10,317,030 | B2* | 6/2019 | Alisafaee | F21S 41/255 |
| 10,422,500 | B2* | 9/2019 | Na | B60Q 1/02 |
| 10,465,875 | B2* | 11/2019 | Nakazato | F21S 41/323 |
| 10,493,898 | B2* | 12/2019 | Kurebayashi | B60Q 1/24 |
| 10,609,148 | B1* | 3/2020 | Tran | G01S 13/88 |
| 10,688,910 | B2* | 6/2020 | Sugimoto | G05D 1/021 |
| 11,173,829 | B1* | 11/2021 | Boecker | H05B 47/10 |
| 11,220,207 | B2* | 1/2022 | Kulkarni | B60Q 1/143 |
| 2006/0119473 | A1* | 6/2006 | Gunderson | G01S 13/878 |
| | | | | 342/126 |
| 2009/0122571 | A1* | 5/2009 | Simmons | B60Q 1/305 |
| | | | | 362/546 |
| 2017/0036592 | A1* | 2/2017 | Hoffmann | B60Q 1/143 |
| 2017/0287335 | A1* | 10/2017 | Ansari | B60W 40/04 |
| 2018/0180243 | A1* | 6/2018 | Na | F21S 41/698 |
| 2018/0372303 | A1* | 12/2018 | Na | F21S 41/147 |
| 2019/0077306 | A1* | 3/2019 | Duncan | B60Q 1/0082 |
| 2019/0202337 | A1* | 7/2019 | Kurebayashi | B60Q 1/04 |
| 2019/0202340 | A1* | 7/2019 | Sugimoto | B60Q 1/085 |
| 2021/0291721 | A1* | 9/2021 | Kulkarni | G01S 15/58 |
| 2021/0291722 | A1* | 9/2021 | Kulkarni | B60Q 1/143 |

* cited by examiner

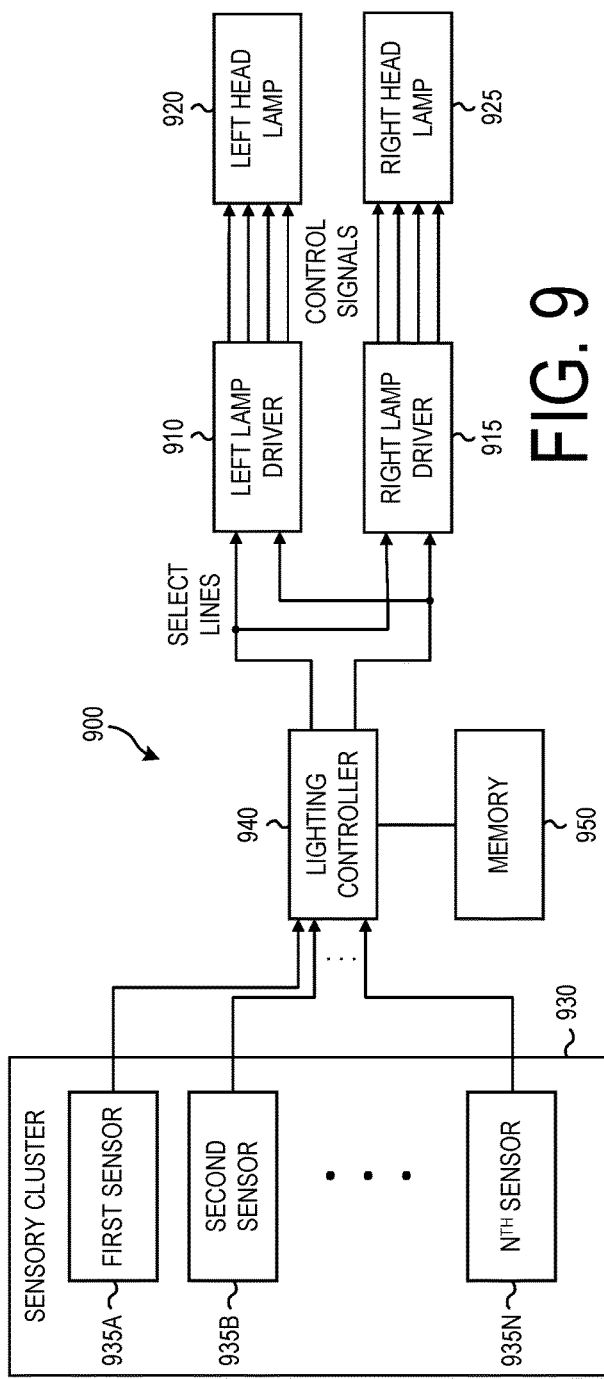
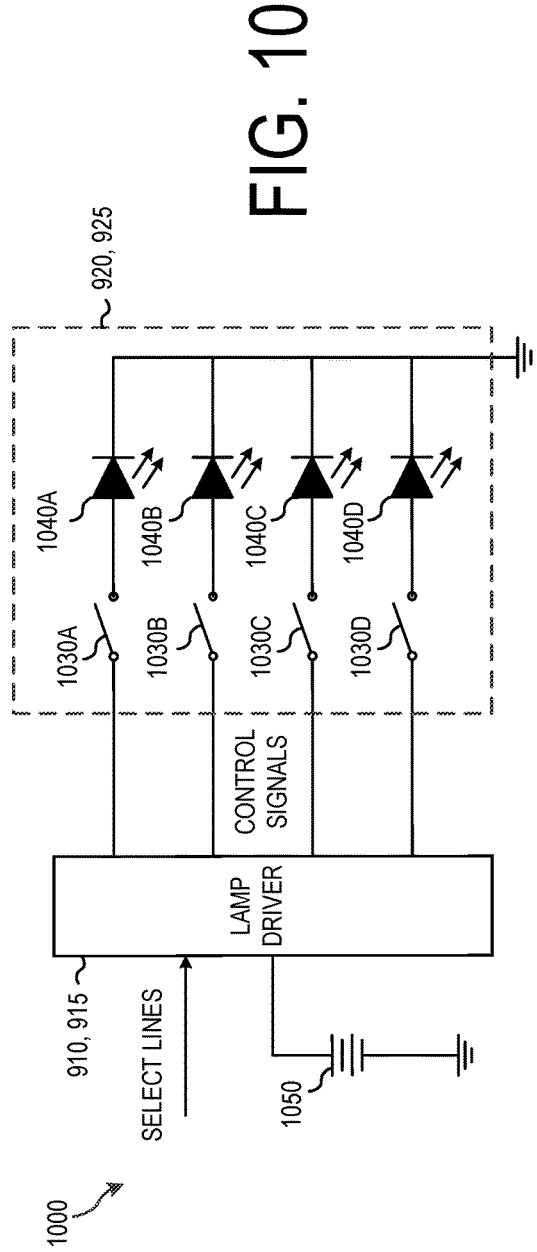

SYSTEM AND METHOD FOR ADAPTIVE DRIVING BEAM HEADLAMP

CROSS REFERENCE TO RELATED APPLICATION

This application is a divisional of U.S. application Ser. No. 16/822,723 filed on Mar. 18, 2020, the disclosure of which is incorporated herein by reference.

FIELD OF THE INVENTION

This disclosure relates to an adaptive driving beam (ADB) headlamp and a method of operating an ADB headlamp. More specifically, it relates to an ADB headlamp system and method in a local vehicle that detects a remote vehicle and automatically dims a high beam directed toward the remote vehicle in a gradual manner to avoid dazzling the driver of the local vehicle.

BACKGROUND OF THE INVENTION

Conventional forward lighting systems typically offer two lighting patterns: a high-beam pattern and a low-beam pattern. The high beam pattern is configured to shine light in a forward field of vision that is brighter than and angled higher than light shone by the low-beam pattern. Since it is at a higher angle, the high-beam pattern will provide lighting for a longer distance, allowing the operator of the vehicle the ability to see farther at night than would be possible using the low-beam pattern. The low-beam pattern is configured to shine light in the forward field of vision at an angle sufficiently low that the operator of an oncoming vehicle immediately in front of the lighting system will not be dazzled by the low-beam pattern.

However, the brighter light and higher angle of the high-beam pattern means that it can potentially dazzle an operator of an oncoming vehicle or a vehicle travelling immediately in front of the vehicle with the high-beam pattern activated. As a result, vehicle operators will typically use the high-beam pattern when no other vehicles are in the forward field of vision and will switch to the low-beam pattern when a vehicle enters the forward field of vision.

Adaptive driving beam (ADB) systems provide an important safety function for a forward lighting system of a vehicle by providing a mechanism to automatically switch between the high-beam pattern and the low-beam pattern. ADB systems typically keep the forward lighting system in a high-beam pattern until an object such as an oncoming vehicle is detected in or about to enter a forward field of vision. At this point, the ADB system switches to a low-beam pattern to avoid dazzling of the driver of the oncoming vehicle.

Conventional ADB systems typically depend on the principle of dynamic switching of a matrix-type structure. This dynamic switching consists of a mechanical means to instantly switch the ADB system from the high-beam pattern to the low-beam pattern to avoid the dazzling effect on the drivers of the oncoming vehicle. The matrix-type structure refers to the placement of LEDs in a particular way in which they can turn on or off based on input sensor signals and decisions made by a control system.

However, the dazzling effect of the high-beam pattern is greatest when an approaching vehicle is closest to the current vehicle with the ADB system and becomes increasingly less the farther away the approaching vehicle is from the current vehicle. Thus, when a conventional ADB system detects an approaching vehicle at a distance and switches from the high-beam pattern to the low-beam pattern, the result is that for most of the time that the oncoming vehicle is in front of the current vehicle and approaching the current vehicle, the forward lighting system could be shining light more brightly and still not dazzle an oncoming vehicle. It would therefore be desirable to provide a lighting device that will gradually decrease a light intensity or angle of the lighting system in the forward field of vision from the highest intensity of the high-beam pattern to the lowest intensity of the low-beam pattern as a vehicle approaches the current vehicle.

SUMMARY OF THE INVENTION

A lighting system for a local vehicle is provided, comprising: a head lamp including a low-beam lamp configured to shine low beam light in a first of zone adjacent to the local vehicle, and a first high-beam lamp configured to shine first high-beam light in the first zone adjacent to the local vehicle; a sensory cluster configured to detect a remote vehicle proximate to the local vehicle, the sensory cluster including a distance sensor configured to determine a distance of the remote vehicle from the local vehicle, and a velocity sensor configured to determine a velocity of the remote vehicle with respect to the local vehicle; and a lighting controller configured to determine a minimum-distance target time when the remote vehicle will reach a minimum distance from the local vehicle based on the distance of the remote vehicle and the velocity of the remote vehicle, and configured to control the operation of the first high-beam lamp based on the distance of the remote vehicle and the velocity of the remote vehicle.

The lighting controller may be further configured to gradually reduce a first light intensity of the first high-beam lamp from a maximum intensity to zero intensity from a detection time at which the sensory cluster detects the remote vehicle to an off-time prior to the minimum-distance time.

The lighting controller may be further configured to gradually increase the first light intensity of the first high-beam lamp from the zero intensity to the maximum intensity from the minimum-distance time to a maximum-intensity time after the minimum-distance time.

The lighting system may further comprise: a second high-beam lamp configured to shine second high-beam light in a second zone adjacent to the local vehicle, the second zone being different from the first zone, wherein the sensory cluster is further configured to determine an identified zone from the first and second zones in which the remote vehicle is located, and the lighting controller is further configured to control the operation of the first and second high-beam lamps based on the minimum-distance time and the target zone, and the identified zone.

The lighting controller may be further configured to gradually reduce a first light intensity of the first high-beam lamp from a maximum intensity to zero intensity from a detection time at which the sensory cluster detects the remote vehicle to an off-time prior to the minimum-distance time, and maintain a second light intensity of the second high-beam lamp at a maximum intensity.

The lighting system may further comprise a first lens configured to pass the first high-beam light from the first high-beam lamp to the first zone; and a second lens configured to pass the second high-beam light from the second high-beam lamp to the second zone, wherein each of the first and second lenses is configured to selectively and independently alter its light transmissivity to between 0% and 100%, and the lighting controller is further configured to individually control the light transmissivity of the first and second lenses based on the minimum-distance time, the target zone, and the identified zone.

The low-beam lamp may shine the low-beam light at a first angle below vertical, the first high-beam lamp may shine the first high-beam light at a second angle below vertical, and the first angle can be greater than the second angle.

The lighting system may further comprise a lamp driver wherein the first high-beam lamp includes one or more light-emitting circuits, and the lamp driver is configured to selectively control operation of each of the one or more light-emitting circuits to transmit between maximum light and no light, including a plurality of light intensities between the maximum light and the no light.

The sensory cluster may include at least one of a camera, a LiDAR sensor, a radar sensor, or a sonar sensor.

The head lamp may include a first headlamp located on a first side of the local vehicle, and a second headlamp located on a second side of the local vehicle different from the first side.

A method of controlling a lighting system for a local vehicle is provided, comprising: turning on a first high-beam lamp in the local vehicle, the first high beam shining a first high-beam light into a first zone adjacent to the local vehicle; detecting a remote vehicle proximate to the local vehicle at a detection time; determining a distance between the local vehicle and the remote vehicle; determining a velocity of the remote vehicle with respect to the local vehicle; estimating a minimum-distance time when the remote vehicle will be at a minimum distance from the local vehicle using the distance between the local vehicle and the remote vehicle and velocity of the remote vehicle with respect to the local vehicle; determining a zero-intensity time that is before the minimum-distance time; determining an intensity function that starts at full intensity at the detection time and drops to zero intensity at the zero-intensity time based on the distance between the local vehicle and the remote vehicle and the velocity of the remote vehicle; gradually reducing a first light intensity of the first high-beam lamp based on the intensity function from when the intensity function is determined to the zero-intensity time based on the intensity function, and maintaining the first light intensity of the first high-beam lamp at zero intensity from the zero-intensity time to the minimum-distance time.

The method may further comprise: gradually increasing the first light intensity of the first high-beam lamp from the zero intensity to the maximum intensity from the minimum-distance time to a maximum-intensity time after the minimum-distance time.

The method may further comprise: turning on a second high-beam lamp in the local vehicle after turning on the first high-beam lamp, the second high beam shining a second high-beam light into a second zone adjacent to the local vehicle, the second zone being different from the first zone; determining that the remote vehicle is located in the first zone after detecting the remote vehicle; and maintaining a second light intensity of the second high-beam lamp at full intensity from the detection time to the minimum-distance time.

The method may further comprise: turning on a low-beam lamp to shine a low-beam light in the first zone before turning on the first high-beam lamp.

The low-beam lamp may shine the low beam light at a first angle below vertical, the first high-beam lamp may shine the first high-beam light at a second angle below vertical, and the first angle can be greater than the second angle.

The operations of detecting the remote vehicle, determining the distance between the local vehicle and the remote vehicle, and determining the velocity of the remote vehicle may be performed using at least one of camera data, LiDAR data, radar data, or sonar data.

A system for operating a lighting system of a local vehicle is provided, comprising: a memory; and a processor cooperatively operable with the memory, and configured to, based on instructions stored in the memory, turn on a first high-beam lamp in the local vehicle, the first high beam shining a first high-beam light into a first zone adjacent to the local vehicle; detect a remote vehicle proximate to the local vehicle at a detection time; determine a distance between the local vehicle and the remote vehicle; determine a velocity of the remote vehicle with respect to the local vehicle; estimate a minimum-distance time when the remote vehicle will be at a minimum distance from the local vehicle using the distance between the local vehicle and the remote vehicle and velocity of the remote vehicle with respect to the local vehicle; determine a zero-intensity time that is before the minimum-distance time; determine an intensity function that starts at full intensity at the detection time and drops to zero intensity at the zero-intensity time based on the distance between the local vehicle and the remote vehicle and the velocity of the remote vehicle; gradually reduce a first light intensity of the first high-beam lamp based on the intensity function from when the intensity function is determined to the zero-intensity time based on the intensity function, and maintain the first light intensity of the first high-beam lamp at zero intensity from the zero-intensity time to the minimum-distance time.

The processor may be further configured to, based on instructions stored in the memory: gradually increase the first light intensity of the first high-beam lamp from the zero intensity to the maximum intensity from the minimum-distance time to a maximum-intensity time after the minimum-distance time.

The processor may be further configured to, based on instructions stored in the memory: turning on a second high-beam lamp in the local vehicle after turning on the first high-beam lamp, the second high beam shining a second high-beam light into a second zone adjacent to the local vehicle, the second zone being different from the first zone; determine that the remote vehicle is located in the first zone after detecting the remote vehicle; and maintain a second light intensity of the second high-beam lamp at full intensity from the detection time to the minimum-distance time.

The processor may be further configured to, based on instructions stored in the memory: turn on a low-beam lamp to shine a low-beam light in the first zone before turning on the first high-beam lamp.

The low-beam lamp may shine the low beam light at a first angle below vertical, the first high-beam lamp may shine the first high-beam light at a second angle below vertical, and the first angle can be greater than the second angle.

The operations of detecting the remote vehicle, determining the distance between the local vehicle and the remote vehicle, and determining the velocity of the remote vehicle may be performed using at least one of camera data, LiDAR data, radar data, or sonar data.

DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

FIG. 9 is a block diagram of an ADB lighting system having right and left head lamps according to disclosed embodiments;

FIG. 10 is a diagram of a portion of the lighting system of FIG. 9 showing control of a single head lamp according to disclosed embodiments;

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Lighting System

Figure 1:
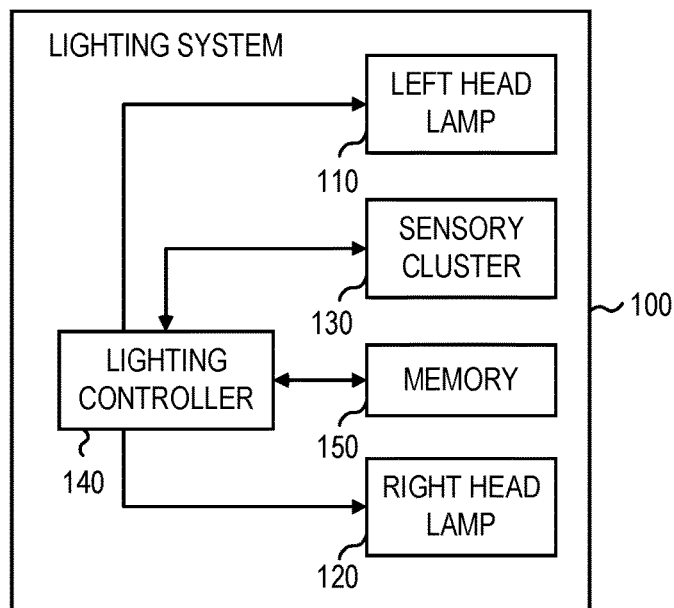
FIG. 1 is a block diagram of an adaptive driving beam (ADB) lighting system according to disclosed embodiments.

FIG. 1 is a block diagram of an adaptive driving beam (ADB) lighting system 100 according to disclosed embodiments. This lighting system is designed for use in a vehicle such as a car, a truck, a motorcycle, a boat, an airplane, or any other type of vehicle that may operate at nighttime or in other situations in which lighting is needed.

As shown in FIG. 1, the lighting system includes a left head lamp 110, a right head lamp 120, a sensory cluster 130, a lighting controller 140, and a memory 150. This lighting system 100 is configured to be installed in a local vehicle (not shown).

The left and right head lamps 110, 120 are vehicular lighting elements configured to illuminate a field of vision in front of the local vehicle. Typically, the left and right headlamps 110, 120 will be arranged to illuminate the same field of vision. Two headlamps 110, 120 are provided so that should one head lamp 110, 120 burn out or otherwise malfunction, the other will still provide illumination in the field of vision in front of the vehicle.

The left and right head lamps 110, 120 are each configured to generate high beam light having a high-beam pattern that covers a high-beam angle of projection with respect to ground and low beam light having a low-beam pattern that covers a low-beam angle of projection with respect to ground. The high-beam angle of projection is higher than the low-beam angle of projection, allowing the high-beam pattern to project light over a greater distance. The head lamps 110, 120 project the low beam light according to the low-beam pattern whenever the head lamps 110, 120 are on, and project the high beam light according to the high-beam pattern whenever the high beams are set to be on.

The high beam light is typically projected in addition to the low beam light such that the combination of the low beam light and maximum-intensity high beam light provides a desired amount of high-beam light for when no remote vehicles are detected in front of the local vehicle.

In various embodiments the left and right head lamps 110, 120 may include one or more light sources with one or more optics for the head lamps 110, 120. The optics may be for individual light sources or there may be a single optic for the light sources. The light sources can include light-emitting diodes (LED), incandescent bulbs, or any other suitable source of light for a light engine. If LEDs are used, they can be connected in series or in parallel.

The left and right head lamps 110, 120 are each also configured to vary the intensity of the high beam light, allowing the intensity of the light projected according to the high-beam pattern to be projected anywhere from zero intensity up to a maximum intensity.

By varying the intensity of the high-beam light in the high-beam pattern, the lighting system 100 can provide a continuum of high-beam intensities from a low-beam setting in which only the low beams are on to a full high-beam setting in which the high beam is also on at a maximum intensity.

The dimming functionality of the light intensity of the head lamps 110, 120 can be provided by using either mechanical means or through electrical means. The head lamps 110, 120 can have dynamic mechanical movement or they may include matrix or pixel sources.

The sensory cluster 130 includes one or more sensors used to detect a speed and distance of a remote vehicle approaching the local vehicle. In various embodiments the sensory cluster can include a camera, a LiDAR sensor, a radar sensor, or a sonar sensor, or any suitable sensor for detecting speed and distance of a remote vehicle. Sensory data generated by the various sensors in the sensory cluster 130 will be sent to the lighting controller 140 for processing.

The lighting controller 140 receives the sensory data generated in the sensory cluster 130 and processes this sensory data to detect an approaching remote vehicle and identify the relative speed and distance of the remote vehicle with respect to the local vehicle. The lighting controller 140 also provides control signals for the operation of the left and right headlamps 110, 120 and the sensory cluster 130. The lighting controller 140 is also connected to the memory 150 and can both store data to the memory 150 and retrieve data from the memory 150.

In various embodiments, the lighting controller 140 can be a microcomputer, a microprocessor, a microcontroller, a CPU, an ASIC, etc. It may also have an integrated memory in addition to or in place of the memory 150.

The memory 150. Includes one or both of a static or dynamic memory and is configured to store data and programming used by the lighting controller 140. In various embodiments, the memory can be SRAM, DRAM, PROM, EPROM, EEPROM, flash memory, or any suitable memory element. The memory 150 is not required in every embodiment.

Communication between the various elements in the lighting system, 100 can include any suitable serial-based communication. For example, a CAN communication protocol can also be used in one embodiment.

This disclosed lighting system 100 can perform the function of dimming a light intensity of the head lamps 110, 120 to avoid a dazzling effect on an approaching vehicle by gradually switching from a high-beam pattern to a low-beam pattern. The lighting system 100 performs the dimming of the light intensity of the head lamps 110, 120 based on a relative speed and distance of the approaching vehicle with respect to the local vehicle. This gradual dimming function can be carried out through either electrical or mechanical means.

Using the sensory cluster 130 and the lighting controller 140, the lighting system 100 can detect and measure the distance and relative speed of an approaching remote vehicle. The lighting system 100 can than vary the intensity of the light projected by the head lamps 110, 120 based on the distance and relative speed of the approaching remote vehicle.

In addition, although the following discussion will consider a single approaching remote vehicle, there may be multiple approaching remote vehicles during the operation of the lighting system 100 in different instances. In such case, the lighting controller 140 can use the sensory data from the sensory cluster 130 to determine the distance and relative speed of each approaching remote vehicle and control the intensity of the light projected by the head lamps 110, 120 according to the data for each remote vehicle.

Likewise, although the following discussion will consider remote vehicles approaching from the front, the system can also account for remote vehicles ahead of the local vehicle and moving in the same direction or remote vehicles passing the local vehicle, thereby entering the area illuminated by the left and right head lamps 110, 120. In such embodiments, the sensory cluster 130 can be configured to detect the presence of a remote vehicle behind or to the side of the local vehicle as well as in front of the local vehicle and the lighting controller 140 can use can use the sensory data from the sensory cluster 132 determine when and at what distance a remote vehicle will enter the field of illumination projected by the lighting system 100 and/or whether a distance between a remote vehicle already in a field of illumination is likely to increase or decrease with respect to the local vehicle and at what speed. Based on this information, the lighting controller 140 can vary the intensity of light projected by the left and right head lamps 110, 122 provide a desired level of light that will not inconvenience the remote vehicle.

Similarly, although the following discussion refers to the detection of remote vehicles immediately in front of the local vehicle, the lighting system 100 can also be configured to detect obstacles or pedestrians either directly in front of the local vehicle or immediately adjacent to the local vehicle (e.g., on the side of a road). In such an embodiment, the lighting system 100 can be configured to vary the intensity of light projected by the left and right head lamps 110, 120 so as not to provide an undesirable intensity of light incident on the obstacles or pedestrians.

Head Lamps

Figure 2:
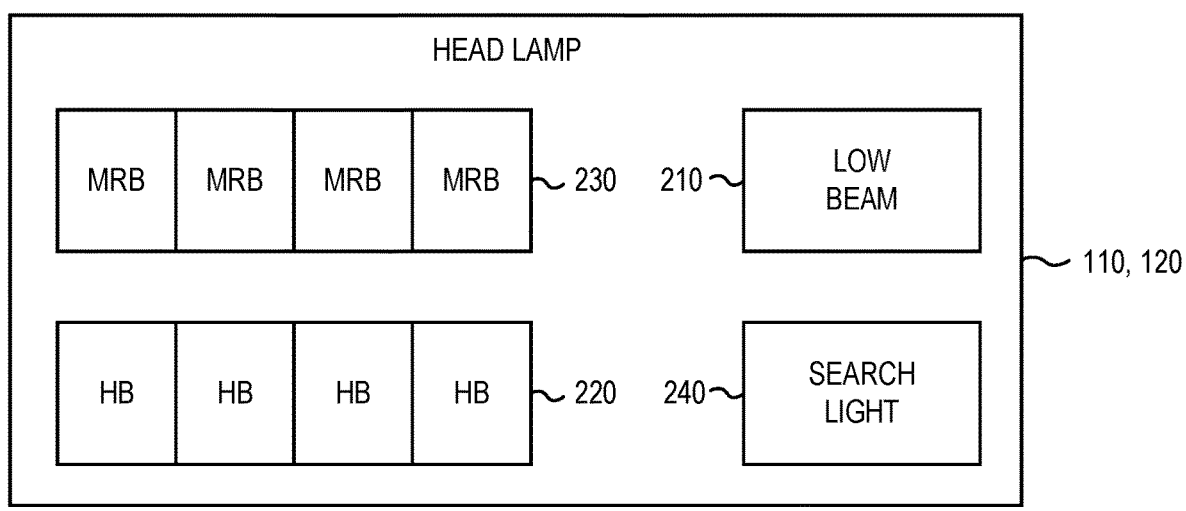
FIG. 2 is a diagram of a head lamp of FIG. 1 according to disclosed embodiments.

FIG. 2 is a diagram of a head lamp 110, 120 of FIG. 1 according to disclosed embodiments. As shown in FIG. 2, the head lamp 110, 120 includes a low-beam lamp 210, a high-beam lamp 220, a middle-range-beam lamp 230, and a search light 240.

The low-beam lamp 210 is a lighting element configured to project a low beam of light in front of the local vehicle in a low-beam pattern. This low-beam pattern is at an angle of projection and an intensity selected so as not to dazzle a driver of a remote vehicle immediately in front of the local vehicle. The low beam represents a base illumination that is always projected when the lighting system 100 is activated.

In the disclosed embodiment, the low beam lamp 210 is configured to project the low beam in a low-beam zone in front of the local vehicle as a single projection of light. The low beam zone is arranged to cover the entire area in front of the local vehicle. In this way, the single low beam lamp 210 operates to project the entirety of the low beam in front of the local vehicle.

The high-beam light 220 is a lighting element configured to project a high beam of light in front of the local vehicle in a high-beam pattern. This high-beam pattern is at an angle of projection and an intensity that is higher than the low beam and therefore could potentially dazzle a driver of a remote vehicle immediately in front of the local vehicle. The high beam projected by the high-beam light 220 is projected in addition to the low beam projected by the low-beam light to 210. The low-beam light 210 and the high-beam light 220 are configured such that the combination of the low beam and the maximum-intensity high beam provide a desired amount of high-beam light for when no remote vehicles are detected in front of the local vehicle.

The high-beam lamp 220 is further configured such that its intensity can be varied from zero to a maximum intensity. In this way, the intensity of light projected by the head lamp 110, 120 can vary along a continuum from only the low-beam pattern up to a combination of the low-beam pattern and the high-beam pattern (i.e., a full-intensity high beam).

In the disclosed embodiment, the high-beam lamp 220 is made up of a matrix of individual high-beam lamp elements that each project high-beam light in a different high-beam zone in front of the local vehicle. The individual high-beam lamp elements are arranged such that together the zones they project light into cover the entire area in front of the local vehicle. Individual zones can overlap or not in different embodiments.

By having a matrix of individual high-beam lamp elements, the head lamp 110, 120 can control the high-beam light individually by zone. As a result, the head lamp 110, 120 could project high-beam light in some zones, good project low-beam light in other zones, and could have a dimming hi-beam light in other zones. This can allow a more granular control of the high and low beams and allow for greater illumination in front of the local vehicle without danger of dazzling the driver of on oncoming remote vehicle.

The middle-range-beam lamp 230 may be included in the head lamp 110, 120 and is a lighting element configured to project middle beam of light in front of the local vehicle in a middle-beam pattern. This middle-beam pattern is at an angle of projection and an intensity that is higher than the low beam, but lower than the high beam. As such, it could potentially dazzle a driver of a remote vehicle immediately in front of the local vehicle. However, since its intensity and angle of projection are lower than that of the high beam, it can be used as an intermediate step between the low beam and the high beam.

In the disclosed embodiment, the middle-beam lamp 230 is made up of a matrix of individual middle-beam lamp elements that each project middle-beam light in a different middle-beam zone in front of the local vehicle. The individual middle-beam lamp elements are arranged such that together the zones they project light into cover the entire area in front of the local vehicle. Individual zones can overlap or not in different embodiments. These zones may be the same as the zones used by the high-beam lamp 220 or may be different in various embodiments.

By having a matrix of individual middle-beam lamp elements, the head lamp 110, 120 can control the middle-beam light individually by zone. As a result, the head lamp 110, 120 could project middle-beam light in some zones, project high-beam light in other zones, and project low-beam light in still other zones. This can allow a more granular control of the high, middle, and low beams and allow for greater illumination without danger of dazzling the driver of on oncoming remote vehicle.

The middle-beam lamp 230 is not required for all embodiments. The following discussion will consider an embodiment with only a low-beam lamp 210 and a high-beam lamp 220 for the sake of simplicity. Although not discussed in detail, if a middle-beam lamp 230 is present, its intensity can be controlled in a manner similar to how the intensity of the high-beam lamp 220 is controlled.

The search light 240 is configured to provide a powerful light in the front of the local vehicle of either an intensity or angle of projection beyond what would be appropriate for even maximum high-beam light. The search light 240 can be used in situations when the local vehicle is not moving and the area in front of the local vehicle needs to be illuminated. The search light 240 need not be present in all embodiments.

Operation of the Lighting System

Figure 3:
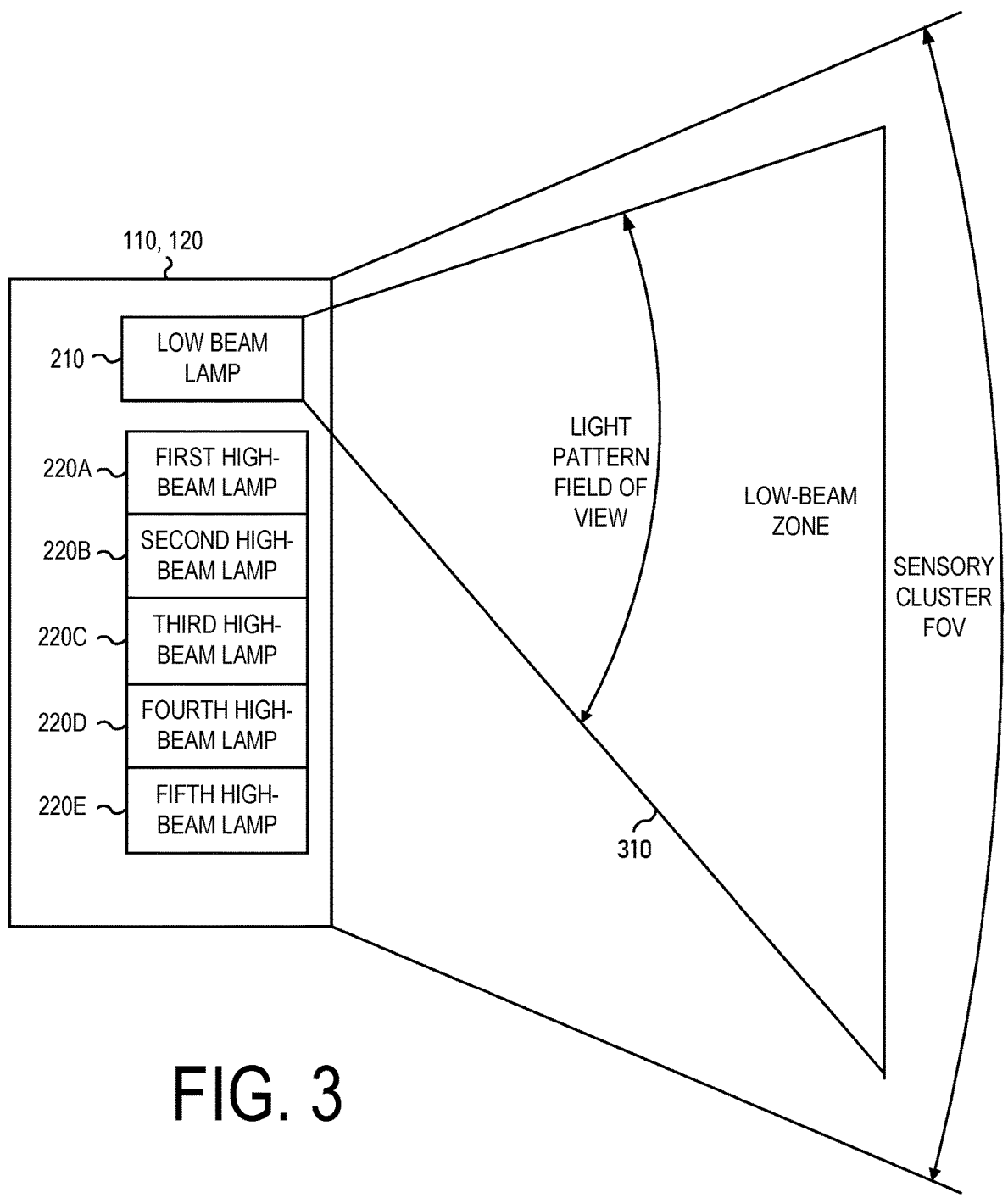
FIG. 3 is a diagram of a head lamp in an ADB lighting system showing a low-beam pattern in a forward field of vision according to disclosed embodiments.

FIG. 3 is a diagram of a head lamp 110, 120 in an ADB lighting system 100 showing a low-beam pattern in a forward field of vision according to disclosed embodiments. As shown in FIG. 3, the head lamp 110, 120 includes a low-beam lamp 210 and first through fifth high-beam lamps 220A, 220B, 220C, 220D, 220E. Together, the first through fifth high-beam lamps 220A, 220B, 220C, 220D, 220E form a high-beam lamp 220. Although FIG. 3 discloses five individual high-beam lamps 220A, 220B, 220C, 220D, 220E making up a high-beam lamp, this is by way of example only. Alternate embodiments could have fewer or greater numbers of individual high-beam lamps. It is also possible that only a single high-beam lamp could be used in some embodiments. For ease of disclosure, individual high-beam lamps 220A, 220B, 220C, 220D, 220E may be generally referred as a high-beam lamps 220.

The low-beam lamp 210 projects low-beam light in a low-beam zone 310 in front of the local vehicle. This low-beam zone 310 covers an entire light pattern field of in front of the local vehicle. The low-beam zone 310 is contained entirely within a sensory cluster field of view that represents an area in which the sensory cluster 130 can detect oncoming remote vehicles.

Figure 4:
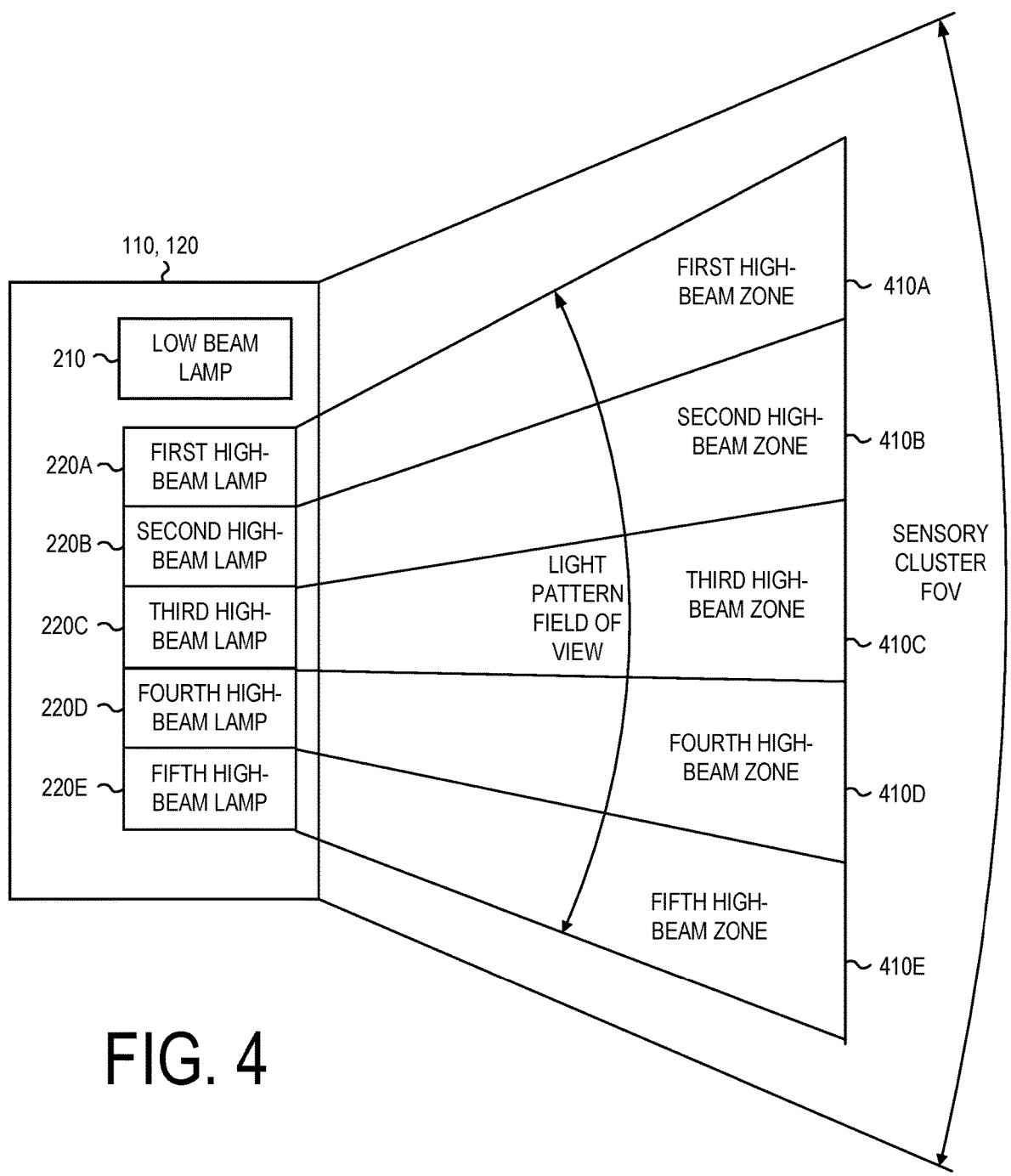
FIG. 4 is a diagram of the head lamp in the lighting system of FIG. 3 showing a high-beam pattern in a forward field of vision according to disclosed embodiments.

FIG. 4 is a diagram of the head lamp 110, 120 in the lighting system 100 of FIG. 3 showing a high-beam pattern in a forward field of vision according to disclosed embodiments. As shown in FIG. 4, the head lamp 110, 120 includes a low-beam lamp 210, and first through fifth high-beam lamps 220A, 220B, 220C, 220D, 220E.

Each high-beam lamp 220A, 220B, 220C, 220D, 220E projects high-beam light in a respective high-beam zone 410A, 410B, 410C, 410D, 410E in front of the local vehicle. The first high-beam lamp 220A projects high-beam light in a first high-beam zone 410A; the second high-beam lamp 220B projects high-beam light in a second high-beam zone 410B; the third high-beam lamp 220C projects high-beam light in a third high-beam zone 410C; the fourth high-beam lamp 220D projects high-beam light in a fourth high-beam zone 410D; and the fifth high-beam lamp 220E projects high-beam light in a fifth high-beam zone 410E. Together, the first through fifth high-beam zones 410A, 410B, 410C, 410D, 410E cover the entire light pattern field of in front of the local vehicle. In the embodiment of FIG. 4, the first through fifth high-beam zones 410A, 410B, 410C, 410D, 410E do not overlap but are each formed to cover the light pattern field of view without overlapping. However, in alternate embodiments some or all the high-beam zones 410A, 410B, 410C, 410D, 410E could overlap. The first through fifth high-beam zones 410A, 410B, 410C, 410D, 410E are contained entirely within the sensory cluster field of view that represents an area in which the sensory cluster 130 can detect oncoming remote vehicles. For ease of disclosure, individual high-beam zones 410A, 410B, 410C, 410D, 410E may be generally referred as a high-beam zones 410.

Each high-beam lamp 220 is configured to controllably vary the intensity of the high-beam light that it projects in in its respective high-beam zone 410 in front of the local vehicle. In this way, the intensity of high-beam light in each of the first through fifth zones 410A, 410B, 410C, 410D, 410E can potentially be different. This allows the head lamp 110, 120 to lessen the intensity of high-beam light in one zone 410, while maintaining high-beam light at a maximum intensity in other zones 410. This can be useful when a remote vehicle is detected in fewer than all the high-beam zones 410. In such a situation, the lighting controller 140 can control the head lamp 110, 122 lesson the high-beam light in only the high-beam zones 410 in which the remote vehicle is detected, while maintaining full-intensity high-beam light in any high-beam zone 410 in which the remote vehicle is not detected. This can maximize the amount of light projected in front of the local vehicle, while eliminating the danger of dazzling operator of the oncoming remote vehicle.

Figure 5:
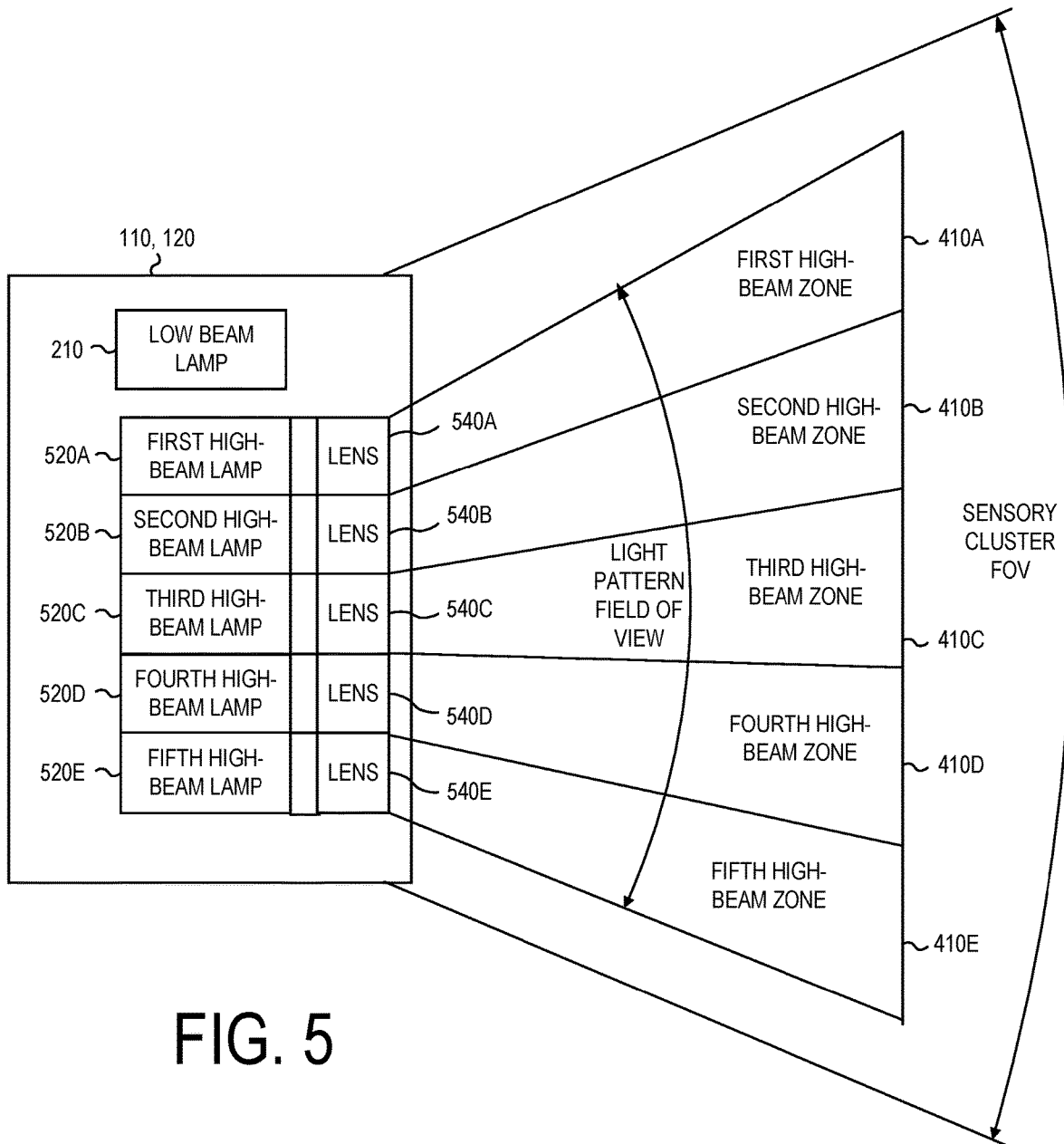
FIG. 5 is a diagram of a head lamp in an ADB lighting system showing a high-beam pattern in a forward field of vision according to alternate disclosed embodiments.

FIG. 5 is a diagram of a head lamp 110, 120 in a lighting system 100 showing a high-beam pattern in a forward field of vision according to alternate disclosed embodiments. As shown in FIG. 5, the head lamp 110, 120 includes a low-beam lamp 210, first through fifth high-beam lamps 520A, 520B, 520C, 520D, 520E, and first through fifth lenses 540A, 540B, 540C, 540D, 540E. For ease of disclosure, individual high-beam lamps 520A, 520B, 520C, 520D, 520E may be generally referred as a high-beam lamps 520, and individual lenses 540A, 540B, 540C, 540D, 540E may be generally referred to as lenses 540.

The low-beam lamp 210 operates as described above with respect to FIGS. 3 and 4.

The first through fifth high-beam lamps 520A, 520B, 520C, 520D, 520E operate similar to the first through fifth high-beam lamps 220A, 220B, 220C, 220D, 220E described above with respect to FIGS. 3 and 4. However, the first through fifth high-beam lamps 520A, 520B, 520C, 520D, 520E may be eliminate the ability to vary the intensity of light projected from the first through fifth high-beam lamps 520A, 520B, 520C, 520D, 520E. Therefore, while they will still project light into the first through fifth high-beam zones, respectively, each high-beam lamp 520 may only project hi-beam of light at a maximum high-beam intensity.

The first through fifth lenses 540A, 540B, 540C, 540D, 540E are located in front of a respective first through fifth high-beam lamps 520A, 520B, 520C, 520D, 520E and are each controlled to attenuate the intensity of a respective high-beam lamp 520. The attenuation of each lens 540 can be controlled by the lighting controller 140. For example, the first through fifth lenses 540A, 540B, 540C, 540D, 540E could be formed of an electrochromic material whose transmissivity could be individually controlled to pass all, some, or none of the light generated by respective first through fifth high-beam lamps 520A, 520B, 520C, 520D, 520E based on control signals from the lighting controller 140.

In this way, the intensity of light projected into the first through fifth high-beam zones can be controlled by controlling the fifth lenses 540A, 540B, 540C, 540D, 540E. This allows for the use of a simpler design for each of the first through fifth high-beam lamps 520A, 520B, 520C, 520D, 520E, since it will not be necessary for the first through fifth high-beam lamps 520A, 520B, 520C, 520D, 520E to be configured such that their intensity can be varied. In this embodiment, it is possible to employ high-beam lamps 520 that can only project light at a single, maximum intensity.

Figure 6:
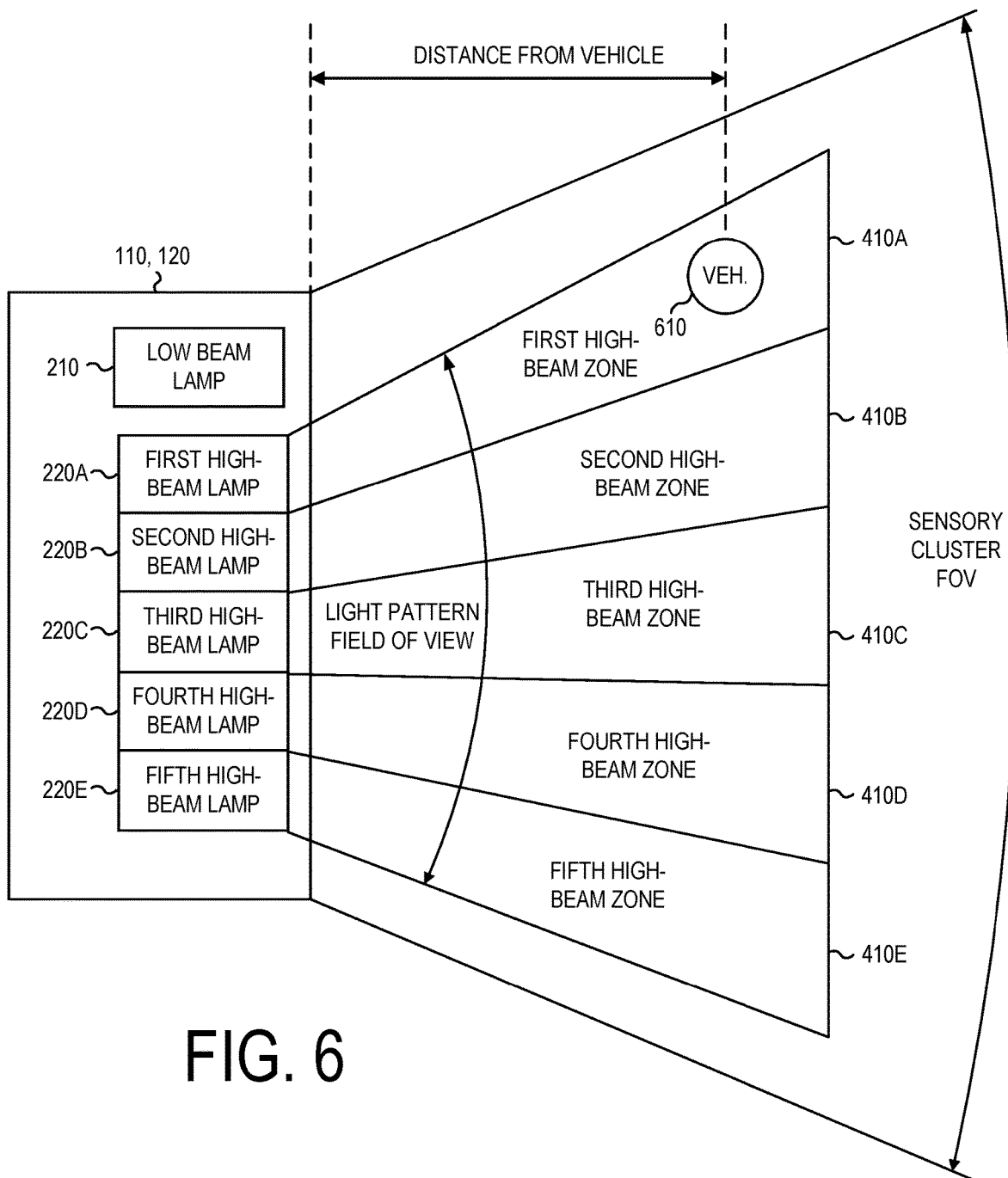
FIG. 6 is a diagram of the head lamp in the lighting system of FIG. 3 showing an approaching vehicle detected in a forward field of view according to disclosed embodiments.

FIG. 6 is a diagram of the head lamp 110, 120 in the lighting system 100 of FIG. 3 showing an approaching remote vehicle 610 detected in a forward light pattern field of view according to disclosed embodiments. As shown in FIG. 6, the head lamp 110, 120 includes a low-beam lamp 210, and first through fifth high-beam lamps 220A, 220B, 220C, 220D, 220E.

The low-beam lamp 210 and the first through fifth high-beam lamps 220A, 220B, 220C, 220D, 220E operate as described above with respect to FIGS. 3 and 4. As noted, the first through fifth high-beam lamps 220A, 220B, 220C, 220D, 220E project high-beam light into first through fifth high-beam zones 410A, 410B, 410C, 410D, 410E, respectively.

The remote vehicle 610 appears in the light pattern field of view only in a first high-beam zone 410A. The sensory cluster 130 in FIG. 1 detects the approaching remote vehicle 610, identifies which zone or zones 410 the remote vehicle 610 is in, determines a distance from the remote vehicle 610 to the local vehicle, and determines the speed of the remote vehicle 610 with respect to the local vehicle. The sensory cluster 130 then reports this information to the lighting controller 140, which can control operation of the first through fifth high-beam lamps 220A, 220B, 220C, 220D, 220E. Specifically, the lighting controller 140 can reduce the intensity of the first high-beam lamp 220A as the remote vehicle 610 approaches the local vehicle.

Although FIG. 6 discloses the remote vehicle 610 being only in the first high-beam zone 410A, this is by way of example only. The remote vehicle 610 could be detected in multiple high-beam zones 410 at the same time. In such a situation, the lighting controller 140 would reduce the intensity of the high-beam lamps 220 shining in those zones 410 and maintain the intensity of the high-beam lamps 220 shining in other zones 410 at a maximum intensity.

Likewise, if the sensory cluster 130 detected the vehicle 610 moving into a new high-beam zone 410, it would reduce the intensity of the high-beam lamp 220 in that zone 410. Similarly, if the sensory cluster 130 detected the vehicle 610 moving out of one of the high-beam zones 410, it would increase the intensity of the high-beam lamp 220 in that zone 410 back to a maximum intensity.

Gradual Reduction of High Beam Intensity

Figure 7:
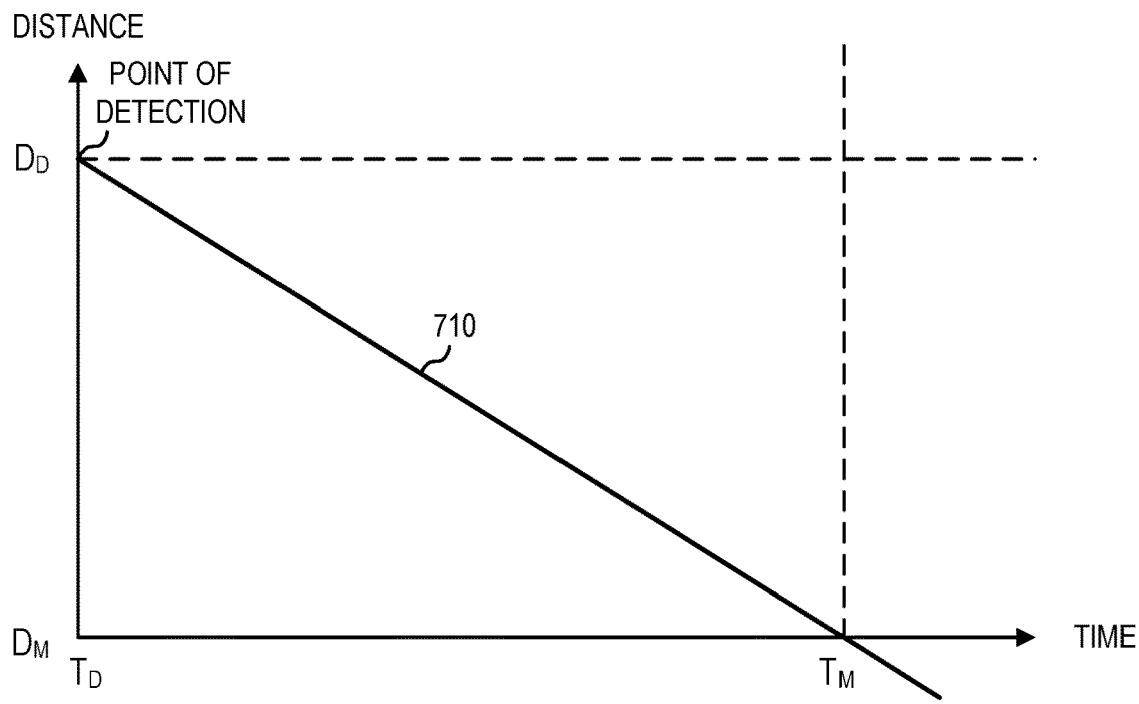
FIG. 7 is a graph of a distance of an approaching vehicle with respect to a local vehicle over time according to disclosed embodiments.
Figure 8:
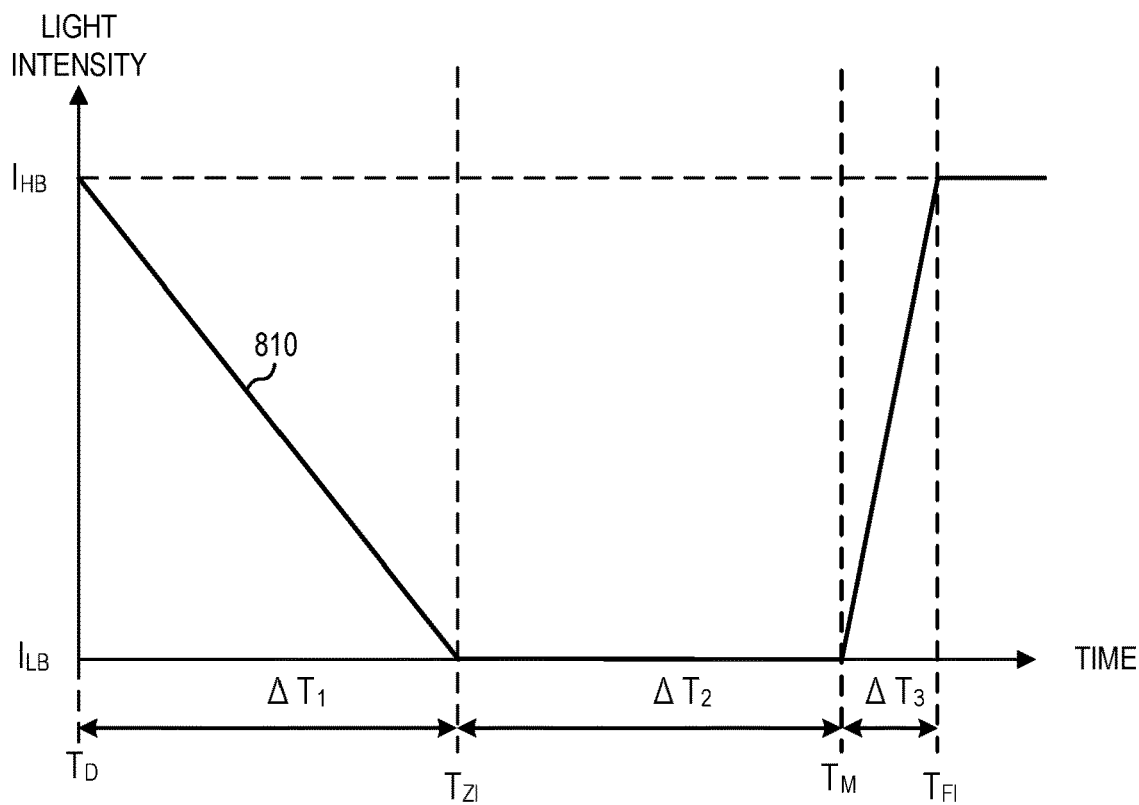
FIG. 8 is a graph of a light intensity of a high-beam lamp in a lighting system over time according to disclosed embodiments.

FIGS. 7 and 8 show an adaptive driving beam (ADB) operation by which the intensity of a high-beam lamp 220 can be reduced gradually as a remote vehicle 610 approaches the local vehicle.

FIG. 7 is a graph of a distance 710 of an approaching vehicle with respect to a local vehicle over time according to disclosed embodiments. FIG. 8 is a graph of a light intensity 810 of a high-beam lamp 220 in a lighting system 100 over time according to disclosed embodiments.

As shown in FIG. 7, the distance of the remote vehicle 610 to the local vehicle varies from a detection distance $D_D$ at a point of detection to a meeting distance $D_M$ at a point immediately adjacent to the local vehicle. Specifically, the distance 710 of the remote vehicle 610 will typically get smaller as the remote vehicle 610 approaches the local vehicle. The meeting distance $D_M$ is not a distance of zero but is a minimum distance at which the remote vehicle 610 is considered immediately adjacent to the local vehicle.

FIG. 7 shows the distance 710 varying in a linear manner from the detection distance $D_D$ at a detection time $T_D$ to the meeting distance $D_M$ at a meeting time $T_M$. However, this is by way of example only. The actual shape of the curve for the distance 710 could vary significantly based on the behavior of the remote vehicle 610. For example, the speed of the remote vehicle 610 might not remain constant, in which case the curve for the distance 710 would not be linear. However, given that a common situation is two vehicles approaching each other on a road, it remains likely that the curve for the distance 710 will be a continually declining function.

Furthermore, given that the future behavior of the remote vehicle 610 is unknowable at any given time, the future shape of the curve for the distance 710 and therefore the meeting time $T_M$ at which the remote vehicle 610 will reach the meeting distance $D_M$ is unknowable. As a result, the lighting controller 140 will be configured to estimate the meeting time $T_M$ based on an estimated function for the curve of the distance 710 from the remote vehicle 610 to the local vehicle.

At the initial point of detection $T_D$, the lighting controller 140 might assume that the curve of the distance 710 is linear. However, as the lighting controller 140 receives additional sensory data from the sensory cluster 130, it may refine its estimate of the behavior of the curve of the distance 710 to a more complex function based on the detected acceleration of the remote vehicle.

As shown in FIG. 8, the lighting controller 140 begins the ADB process as soon as a remote vehicle 610 is detected at a detection distance $D_D$ by controlling the intensity of a high-beam lamp 220 such that it will be lowered from a high-beam intensity $I_{HB}$ down to a low-beam intensity $I_{LB}$ prior to the expected time that the remote vehicle 610 will move from the detection distance $D_D$ to the meeting distance $D_M$. As used in this discussion, the high-beam intensity $I_{HB}$ represents an intensity in which the low-beam lamp 210 is transmitting and the high-beam lamp 220 is transmitting at maximum intensity, and the low-beam intensity $I_{LB}$ represents an intensity in which the low-beam lamp 210 is transmitting and the high-beam lamp 220 is not transmitting at all (i.e., is at zero intensity).

Specifically, the lighting controller 140 operates to control the relevant high-beam lamp 220 to reduce its intensity from the high-beam intensity $I_{HB}$ to the low-beam intensity $I_{LB}$ from the detection time $T_D$ to a zero-intensity time $T_{ZI}$ that is prior to the meeting time $T_M$. The first time duration $\Delta T_1$ represent the time from the detection time $T_D$ to the zero-intensity time $T_{ZI}$, and the second time duration $\Delta T_2$ represent the time from the zero-intensity time $T_{ZI}$ to the meeting time $T_M$. Thus, there will be a second time duration $\Delta T_2$ between the zero-intensity time $T_{ZI}$ and the meeting time $T_M$ during which the high-beam lamp is at zero intensity (i.e., off).

Setting the zero-intensity time $T_{ZI}$ to be before the meeting time $T_M$ ensures that the high-beam lamp 220 will be fully off for some time ($\Delta T_2$ below) before the remote vehicle 610 gets close enough to the local vehicle for the high-beam light to dazzle the driver of the remote vehicle 610. It also avoids rapid changes in light intensity and allows for a maximum amount of light shining in front of the local vehicle when allowable.

Once the remote vehicle 610 reaches the meeting distance $D_M$ at the meeting time $T_M$, it will presumably pass the local vehicle and exit the sensor cluster field of view. Assuming this happens and that there are no other remote vehicles 610 remaining in the sensor cluster field of view, the lighting controller 140 will then instruct the high-beam lamp 220 to gradually increase its high-beam intensity such that the output of the head lamp will rise from the low-beam intensity $I_{LB}$ to the high-beam intensity $I_{HB}$. The lighting controller 140 achieves this by turning the associated high-beam lamp 220 on and gradually increasing its intensity from a minimum intensity to a maximum intensity over a third time duration $\Delta T_3$ from the meeting time $T_M$ to a full-intensity time $T_{FI}$.

In the disclosed embodiment the third time duration $\Delta T_3$ is smaller than both the first time duration $\Delta T_1$ and the second time duration $\Delta T_2$. However, this is by way of example only. Different embodiments can vary the first, second, and third time durations $\Delta T_1$, $\Delta T_2$, $\Delta T_3$ as desired to achieve a desired level of performance.

Since the meeting time $T_M$ depends upon the speed of the remote vehicle 610, an estimate of the meeting time $T_M$ by the lighting controller 140 may also change over time. As a result, the values for the first and second time durations $\Delta T_1$, $\Delta T_2$ may also vary over time. The first and second time durations $\Delta T_1$, $\Delta T_2$ may be set as fixed times or may be calculated as percentage values. For example, the value of one of the first and second time durations $\Delta T_1$, $\Delta T_2$, might be fixed with the other one being equal to the meeting time $T_M$ minus the other of the first and second time durations $\Delta T_1$, $\Delta T_2$. In the alternative, the second time duration $\Delta T_2$ could be fixed to allow for a guaranteed minimum distance at which the low-beam intensity $I_{LB}$ would be achieved. Likewise, the first and second time durations $\Delta T_1$, $\Delta T_2$ could be set to be percentages of the time $(T_M - T_D)$.

The control of light intensity described above with respect to FIG. 8 can be done for the entire high-beam lamp 220 or for only the individual high-beam lamps 220 corresponding to zones 410 in which the sensory cluster 130 detects the remote vehicle 610.

Furthermore, the control of the intensity of the an associated high-beam lamp 220 depends on the sensory data provided by the sensory cluster 130. As circumstances change based on this sensory data, the lighting controller 140 would adjust the operation of the high-beam lamp accordingly.

For example, during the approach of the remote vehicle 610 to the local vehicle the remote vehicle 610 might leave the sensory cluster field of view altogether, leaving no other remote vehicles 610 in the sensory cluster field of view. This might happen if the remote vehicle 610 turns off of the road in front of the local vehicle. In this case, the lighting controller 140 would immediately cause the associated high-beam lamp 220 to increase its intensity from its current point to maximum intensity, similar to how it is shown in the third time duration $\Delta T_3$.

Likewise, when the closest detected remote vehicle 610 reaches the meeting distance $D_M$ and passes the local vehicle, there may be other remote vehicles 610 detected in the same high-beam zone 410. In this case, the lighting controller 140 could instruct the high-beam lamp 220 to maintain its zero intensity until a point at which no remote vehicles 610 remain in the associated high-beam zone 410, at which point it would then instruct the high-beam lamp 220 to gradually increase its intensity until it reached full intensity, as shown in the third time duration $\Delta T_3$.

In addition, since the operation of an approaching remote vehicle 610 may change over time, the sensory cluster 130 can continually monitor the distance and speed of the remote vehicle 610 as well as which high-beam zones 410 the remote vehicle is in. The lighting controller 140 can use the updated sensory data from the sensory cluster 130 to periodically adjust the operation of the individual high-beam lamps 220. For example, the lighting controller 140 could instruct a high-beam lamp 220 to speed up or slow down the reduction of intensity from the maximum intensity to the minimum intensity if the speed of the remote vehicle 610 changes. Likewise, the lighting controller 140 could stop reducing intensity in one zone 410 and if the sensory cluster 130 detects the remote vehicle 610 leaving a high-beam zone 410 and can start reducing intensity in another zone 410 if the sensory cluster 130 detects the remote vehicle 610 entering a new zone 410.

Furthermore, although FIG. 8 shows that the reduction of the intensity of a selected high-beam lamp 220 is linear, this is by way of example only. The function of declining intensity of the high-beam lamp can be any function of the detected distance between the remote vehicle 610 and the local vehicle and the detected speed of the remote vehicle 610 with respect to the local vehicle.

The control function or control action (AC) of the high-beam lamps in the disclosed ADB system is a metric of the reduction of intensity per distance reduction between the two vehicles. The control action (AC) is defined generally as a metric in Equation (1):

$$AC = f_{dim}(V_R, D_R), \quad (1)$$

where AC is the control action for the light intensity dimming operation, $V_R$ is the relative speed of the remote vehicle 610 with respect to the local vehicle, and $D_R$ is the distance between the remote vehicle 610 and the local vehicle.

The control action (AC) is extended over each component or an associated source of a lighting matrix. For example, if light-emitting diodes (LEDs) are used in the high-beam lamps 220 and there are n LEDs in a matrix for a single-sided lamp, the equation for the first LED would be:

$$AC^1 = f_{dim}(V_R^1, D_R^1), \quad (2)$$

and the equation for the $n^{th}$ LED would be:

$$AC^n = f_{dim}(V_R^n, D_R^n) \qquad (2)$$

The resistance value change for controlling the $n^{th}$ LED is the Control Action (AC). Thus, the complete light pattern at a time instance t after the detection of the remote vehicle 610 in a forward lighting field of view can be shown as:

$$\sum_{i=1}^{n} AC^i. \qquad (4)$$

Control of the Head Lamps

FIG. 9 is a block diagram of an ADB lighting system 900 having right and left head lamps 920, 925 according to disclosed embodiments. As shown in FIG. 9, the lighting system 900 includes left and right lamp drivers 910, 915, left and right head lamps 920, 925, a sensory cluster 930, a lighting controller 940, and a memory 950. The sensory cluster 930 includes first through $N^{th}$ sensors 935A, 935B, . . . 935N.

In this disclosed embodiment the left and right head lamps 920, 925 each have four lighting circuits to provide light. These lighting circuits could be LED circuits, incandescent lighting circuits, or any other suitable lighting circuit. FIG. 9 shows a simplified version of the head lamps 920, 925 used in an exemplary fashion to show how the lighting system 900 operates. Actual head lamps 920, 925 could have a much larger number of light circuits, with a corresponding number of select lines and control signals.

The left and right lamp drivers 910, 915 operate to provide control signals to the left and right head lamps 920, 925 based on select lines received from the lighting controller 940. These control signals control the operation of the light circuits inside the head lamps 920, 925. If there are N control signals being generated by the lamp drivers 910, 915, then the lamp drivers 910, 915 must each receive at least $\log_2 N$ select signals from the lighting controller 940, rounded up. In other words, N select signals allow the lamp drivers 910, 915 to each generate up to $2^N$ control signals.

The control signals provided by the lamp drivers 910, 915 indicate which light circuits in the head lamps 920, 925 should be activated and at what intensity they should be activated. In this way, the intensity of light output from the head lamps 920, 925 can be controlled. Furthermore, if individual light circuits shine on different high-beam zones, the lamp drivers 910, 915 can control the intensity of high-beam light separately for each different high-beam zone.

The left and right head lamps 920, 925 operate similarly to the left and right head lamps 110, 120 described above with respect to FIG. 1. However, FIG. 9 adds the additional detail that each head lamp 920, 925 in this embodiment includes four light circuits (not shown) controlled by four control signals. As noted above, the operation status and intensity of each light circuit is controlled separately by control signals received from a respective lamp driver 910, 915.

Although not explicitly shown in FIG. 9, the head lamps 920, 925 in this embodiment would each have a low-beam lamp 210 and one or more high-beam lamps 220, as described above with respect to FIG. 2. These elements would operate as described above.

The sensory cluster 930 operates similarly to the sensory cluster 130 described above with respect to FIG. 1. However, FIG. 9 provides more detail with respect to the configuration of the sensory cluster 930. Specifically, the sensory cluster 930 includes the first through $N^{th}$ sensors 935A, 935B, . . . 935N. These sensors can be the same type of sensors or different sensors in various embodiments. For example, there could be separate sensors for each high-beam zone. Alternatively, there could be different types of sensors that cover the entire sensory cluster field of view but provide different sensory data. Regardless, the sensors 935 are configured to provide various sensory data regarding the sensor cluster field of view that allows the lighting controller 940 to detect an approaching remote vehicle 610, identify which zone or zones the remote vehicle 610 is in, determine the distance from the remote vehicle 610 to the local vehicle, and determine the speed of the remote vehicle 610 with respect to the local vehicle.

In various embodiments the sensory cluster can include a camera, a LiDAR sensor, a radar sensor, or a sonar sensor, though this is by way of example only. In alternate embodiments the sensory cluster 930 can have any kind of sensor 935 required to provide sensory data that allows the lighting controller 940 to make the above determinations about a remote vehicle.

Although the above description focuses on detecting remote vehicles 610 in the forward light pattern field of view, alternate embodiments could include sensors 935 that detect remote vehicles 610 in fields of view behind the local vehicle or to the sides of the local vehicle. This sensor information could assist the lighting controller 940 in determining whether a remote vehicle 610 is likely to enter the forward light pattern field of view and prepare accordingly.

Likewise, the sensory cluster 930 could have sensors 935 configured to detect pedestrians or obstacles proximate to the local vehicle. In such an embodiment, the lighting controller 940 could be configured to reduce the intensity of high-beam light in any high-beam zone that would potentially dazzle a pedestrian or prove a hazard to any obstacle.

The lighting controller 940 operates similarly to the lighting controller 140 described above with respect to FIG. 1. Specifically, the lighting controller 940 receives sensory data from the sensors 935 in the sensory cluster 930 and uses this data to provide the control signals to the lamp drivers 910, 920 based on the presence of an approaching remote vehicle 610, a high-beam zone or zones the remote vehicle 610 is in, the distance from the remote vehicle 610 to the local vehicle, and the speed of the remote vehicle 610 with respect to the local vehicle.

The lighting controller 940 is also connected to the memory 950 and can both store data to the memory 950 and retrieve data from the memory 950.

In various embodiments, the lighting controller 940 can be a microcomputer, a microprocessor, a microcontroller, a CPU, an ASIC, etc. It may also have an integrated memory in addition to or in place of the memory 950.

The memory 950 operates similarly to the memory 150 described above with respect to FIG. 1. The memory 950. Includes one or both of a static or dynamic memory and is configured to store data and programming used by the lighting controller 140. In various embodiments, the memory can be SRAM, DRAM, PROM, EPROM, EEPROM, flash memory, or any suitable memory element. The memory 950 is not required in every embodiment.

FIG. 10 is a diagram of a portion 1000 of the ADB lighting system 900 of FIG. 9 showing control of a single head lamp 920, 925 according to disclosed embodiments. As shown in FIG. 10, the portion 1000 of the lighting system 900 includes a lamp driver 910, 915, a head lamp 920, 925, and a power source 1050. The head lamp 920, 925 includes a plurality of switches 1030A, 1030B, 1030C, 1030D (switches 1030 for ease of disclosure) and a plurality of corresponding light emitting diodes (LEDs) 1040A, 1040B, 1040C, 1040D (LEDs 1040 for ease of disclosure).

The lamp driver 910, 915 operates as noted above in the discussion of FIG. 9. More specifically, the lamp driver 910, 915 receives power from the power source 1050 and select lines from the lighting controller 940 and generates control signals for the LEDs 1040 based on the received power and select lines. These control signals provide a current to activate the various LEDs 1040. The current level of the control signals will determine the intensity of light generated by a selected LED 1040. A full current will result in a maximum intensity of generated light, while a lower current will result in a correspondingly lower intensity of generated light, until the current is low enough that the LED 1040 no longer generates any light (i.e., a minimum intensity of generated light).

The head lamp 920, 925 generates high-beam light from the LEDs 1040 based on the control signals generated by the lamp driver 910, 915. Thus, the LEDs 1040 form part of a high-beam lamp within the head lamp 920, 925.

Each LED 1040 is separately controlled so the light generated by the head lamp 920, 925 can vary significantly, particularly in different high-beam zones. For example, the lamp driver 910, 915 could provide control signals that cause the first, second, and fourth LEDs 1040A, 1040B, 1040D to generate full intensity light and provide a control signal that causes the third LED 1040C to slowly reduce its generated light intensity over time.

Although not explicitly shown in FIG. 10, the head lamps 920, 925 in this embodiment would also have a low-beam lamp 210 provided to generate low-beam light in a light pattern field of view, as described above with respect to FIGS. 2 and 3.

The power source 1050 is connected to the lamp driver 910, 915 and provides the power required to activate the LEDs 1040. The power source 1050 could be a battery, an alternator, or any suitable device for providing power in a vehicle.

The plurality of switches 1030 are connected between the lamp driver 910, 915 and corresponding LEDs 1040. Each switch 1030 can be opened by controls from the lamp driver 910, 915 or the lighting controller 940 to immediately shut off the corresponding LED 1040 and in doing so immediately turn off the high-beam light generated by that LED 1040. This provides a way for the lighting controller 940 to provide an immediate shut down of a portion of the high beam generated by the head lamp 920, 925 if necessary.

The plurality of LEDs 1040 operate as a part of a high-beam lamp and illuminate one or more high-beam zones in the light pattern field of view based on the control signals received from the lamp driver 910, 915. The LEDs 1040 are configured such that they emit a variable amount of light depending upon the size of the current provided to them. In this way, each LED 1040 can be individually controlled to provide a different intensity of high-beam light to a corresponding high-beam zone.

Although FIG. 10 shows the use of LEDs 1040, these could be replaced in an alternate embodiment by any light circuit that could be controlled to emit a variable amount of light. Likewise, although FIG. 10 shows for LEDs 1040, this is by way of example only. Alternate embodiments could employ more or fewer LEDs 1040.

Some embodiments can also include a power-up bit testing circuit that periodically checks the functional health of the LEDs 1040.

Method of Controlling High-Beam Light

Figure 11:
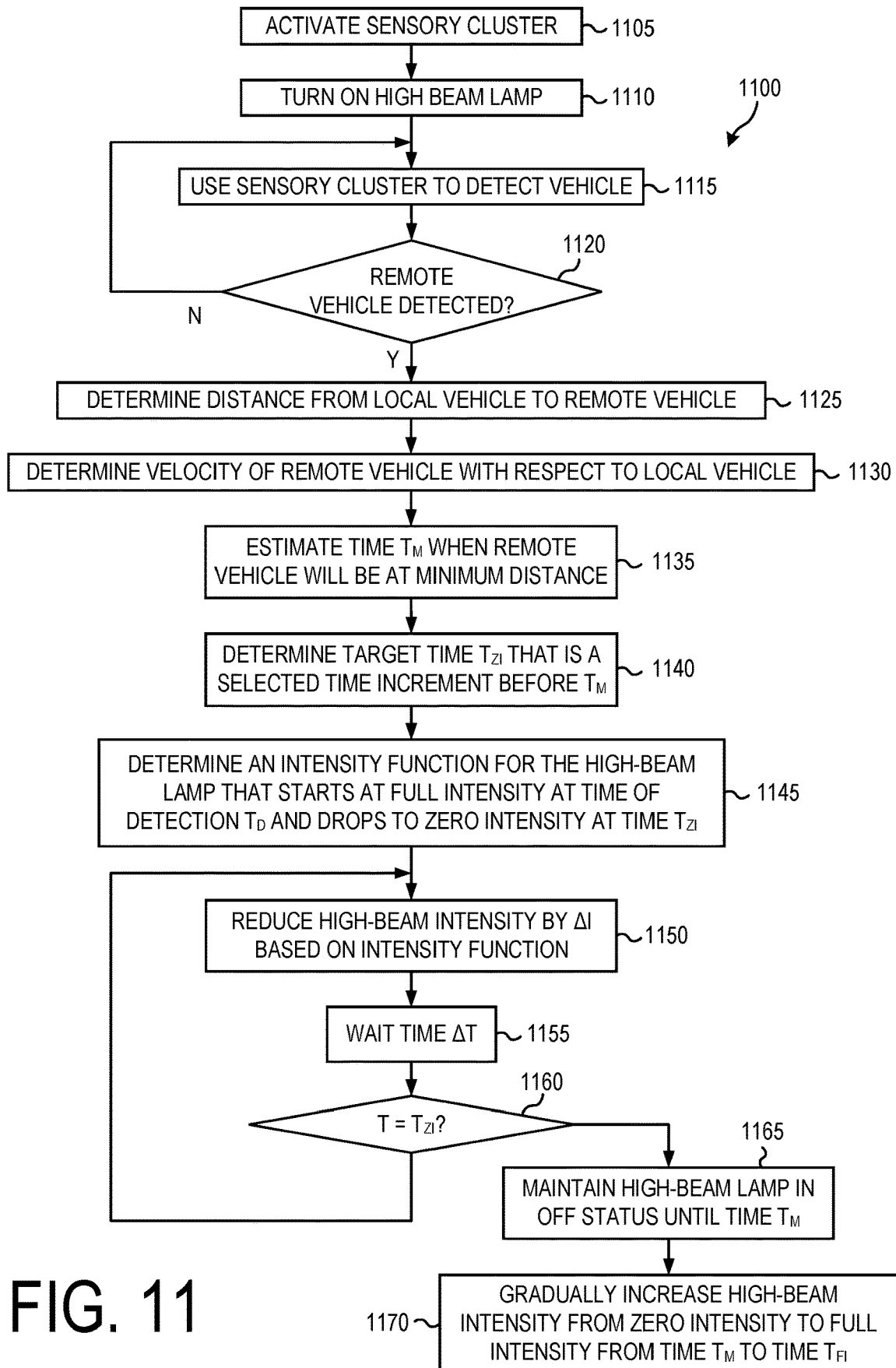
FIG. 11 is a flowchart describing the operation of an ADB lighting system according to disclosed embodiments.

FIG. 11 is a flowchart describing the operation of an adaptive driving beam (ADB) lighting system according to disclosed embodiments.

As shown in FIG. 11, operation begins by activating a sensory cluster (1105). The sensory cluster includes one or more sensors that can detect an approaching remote vehicle, determine the speed of the remote vehicle with respect to the local vehicle, and determine the distance of the remote vehicle from the local vehicle. The sensory cluster could include a camera, a LiDAR sensor, a radar sensor, a sonar sensor, or any suitable sensor for detecting the vehicle, its relative speed, and its distance.

A high-beam lamp is then turned on to shine high-beam light in the light pattern field of view in front of the local vehicle (1110). In many embodiments full high-beam illumination is achieved by having a low-beam lamp shine low-beam light in the light pattern field of view and have the high-beam lamp shine the high-beam light in the light pattern field of view in addition to the low-beam light. The combination of the low-beam light and the high-beam light results in full high-beam illumination. In such embodiments the low-beam lamp will already be on when the high-beam lamp is activated, or the low-beam lamp will be activated concurrently with the high-beam lamp.

The sensory cluster then operates to continually detect whether a remote vehicle enters a sensory cluster field of view in front of the local vehicle (1115) and in doing so determine whether a remote vehicle is detected (1120).

If no remote vehicle is detected, the system simply continues to use the sensory cluster to detect a remote vehicle (1110) and determine if a remote vehicle has been detected (1115).

If, however, a remote vehicle is detected, the lighting system determines a distance from the local vehicle to the remote vehicle (1125) and determines a velocity of the remote vehicle with respect to the local vehicle (1130).

The lighting system then estimates a meeting time $T_M$ at which the remote vehicle will be at a minimum distance from the local vehicle based on the determined relative velocity of the remote vehicle with respect to the local vehicle and the distance from the remote vehicle to the local vehicle (1135). In one embodiment, the lighting system can assume that the speed of the remote vehicle will remain constant and divide distance by speed to obtain an estimate of the meeting time $T_M$. However, alternate embodiments can base the estimate of the meeting time $T_M$ on multiple values of speed and distance collected over time using a more nuanced calculation using a more nuanced formula.

The lighting system then determines a zero-intensity target time $T_{ZI}$ at which the intensity of the high-beam lamp should drop to zero (1140). This zero-intensity target time $T_{ZI}$ will be before the estimated meeting time $T_M$ by a certain time interval. In some embodiments the time interval can be a fixed value; in other embodiments the time interval can be a function of the estimated meeting time $T_M$ and a current time. For example, the time interval could be a percentage of the time between the current time and the estimated meeting time $T_M$.

The lighting system then determines an intensity function for the high-beam lamp that starts at full intensity (or a current intensity if the high-beam lamp is not currently at full intensity) and drops to zero intensity at the zero-intensity target time $T_{ZI}$ (1145). In some embodiments this can be as simple as a linear relationship. Alternate embodiments can use more complicated functions of the detected relative speed and distance to achieve this result. For example, the function could be hyperbolic, stepwise, or any complex function, as desired.

Once the function is determined, the lighting system then reduces the intensity of the high-beam lamp by an incremental intensity ΔI based on the intensity function (1150). In some embodiments the incremental intensity ΔI will remain constant throughout the entire operation. In other embodiments the incremental intensity ΔI can be a dynamic value that is repeatedly adjusted during operation. If the incremental intensity ΔI is adjusted, it can be adjusted based on time, distance, relative speed, or any desirable measurement or variable, as well as a combination of such values. The value ΔI is determined such that the high-beam intensity will drop to zero by the zero-intensity target time $T_{ZI}$.

After reducing the high-beam intensity by the incremental intensity ΔI, the lighting system will wait a delay time ΔT (1155). This allows the sensory cluster to update the values for relative speed and distance.

After the delay time ΔT, the lighting system will determine whether the current time is equal to the zero-intensity target time $T_{ZI}$ (1160). The zero-intensity target time $T_{ZI}$ is the time at which the intensity of the high-beam lamp should be at zero intensity (i.e., off).

If the current time is not equal to the zero-intensity target time $T_{ZI}$, then the lighting system will again reduce the high-beam intensity by the incremental intensity ΔI (1150), wait the delay time ΔT (1155), and determine whether the current time is equal to the zero-intensity target time $T_{ZI}$ (1160). Although not explicitly stated, if the incremental intensity ΔI is a dynamic value, this operation can include updating the value for the incremental intensity ΔI.

If the current time is equal to the zero-intensity target time $T_{ZI}$, then the lighting system will maintain the high-beam lamp in an off status until the meeting time $T_M$ (1165) and then gradually increase the high-beam intensity from zero back to full intensity from the meeting time $T_M$ to a full-intensity time $T_R$ after the meeting time $T_M$ (1170).

Although not shown in FIG. 11, the lighting system can also turn off the high-beam lamp after the time reaches the zero-intensity target time $T_{ZI}$ if for some reason the high-beam lamp is still on when the current time reaches the zero-intensity target time $T_{ZI}$.

Furthermore, the lighting system can also make a further determination as to whether the initially detected remote vehicle or another remote vehicle is in the light pattern field of view prior to increasing the high-beam intensity back to a full value (1170). In this way the lighting system can keep itself from turning the high beams back on when there is still a remote vehicle close enough to the local vehicle that an operator could be dazzled by high-beam light.

Figure 12A:
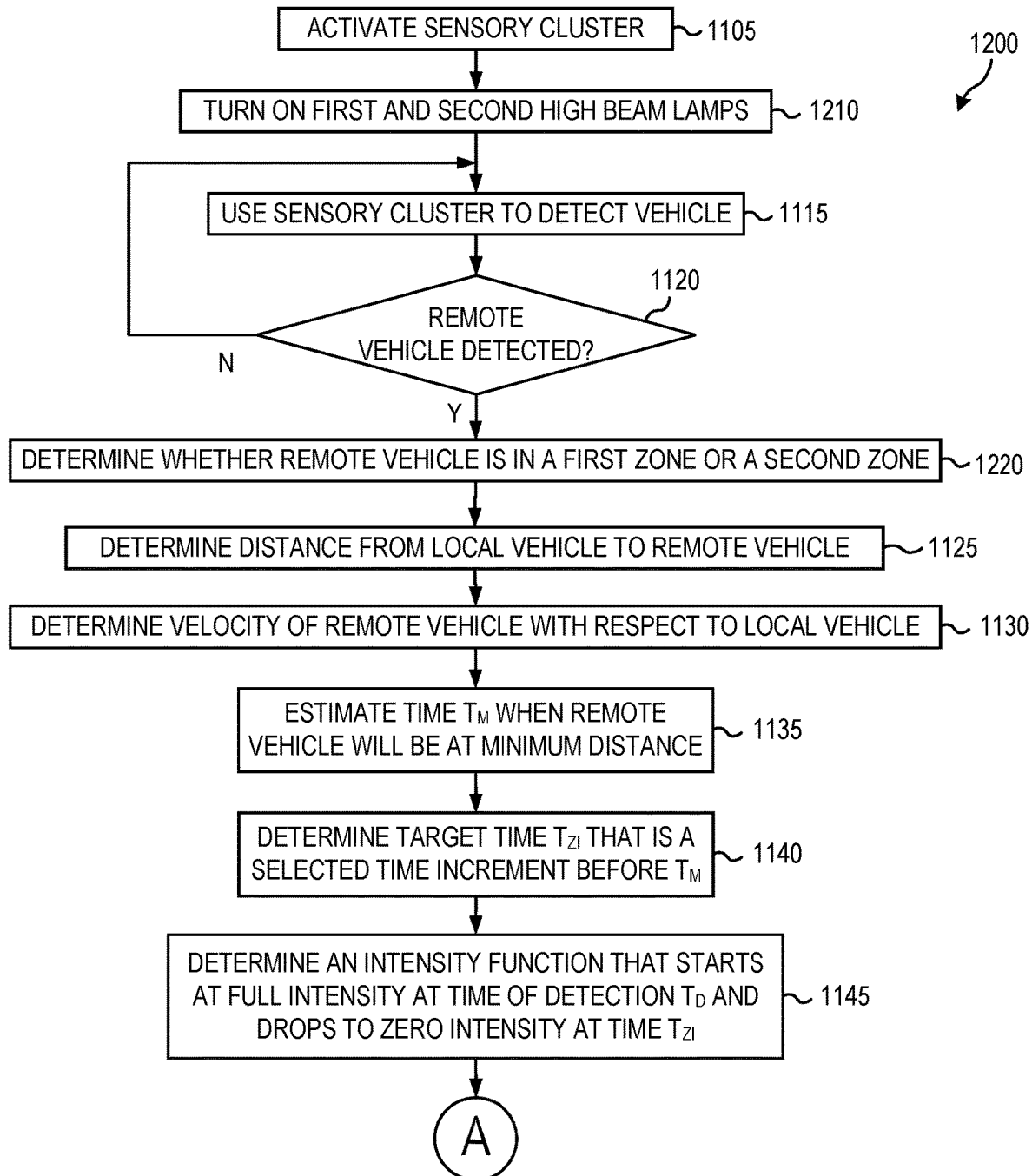
FIGS. 12A and 12B show a flowchart describing the operation of an ADB lighting system according to alternate disclosed embodiments.
Figure 12B:
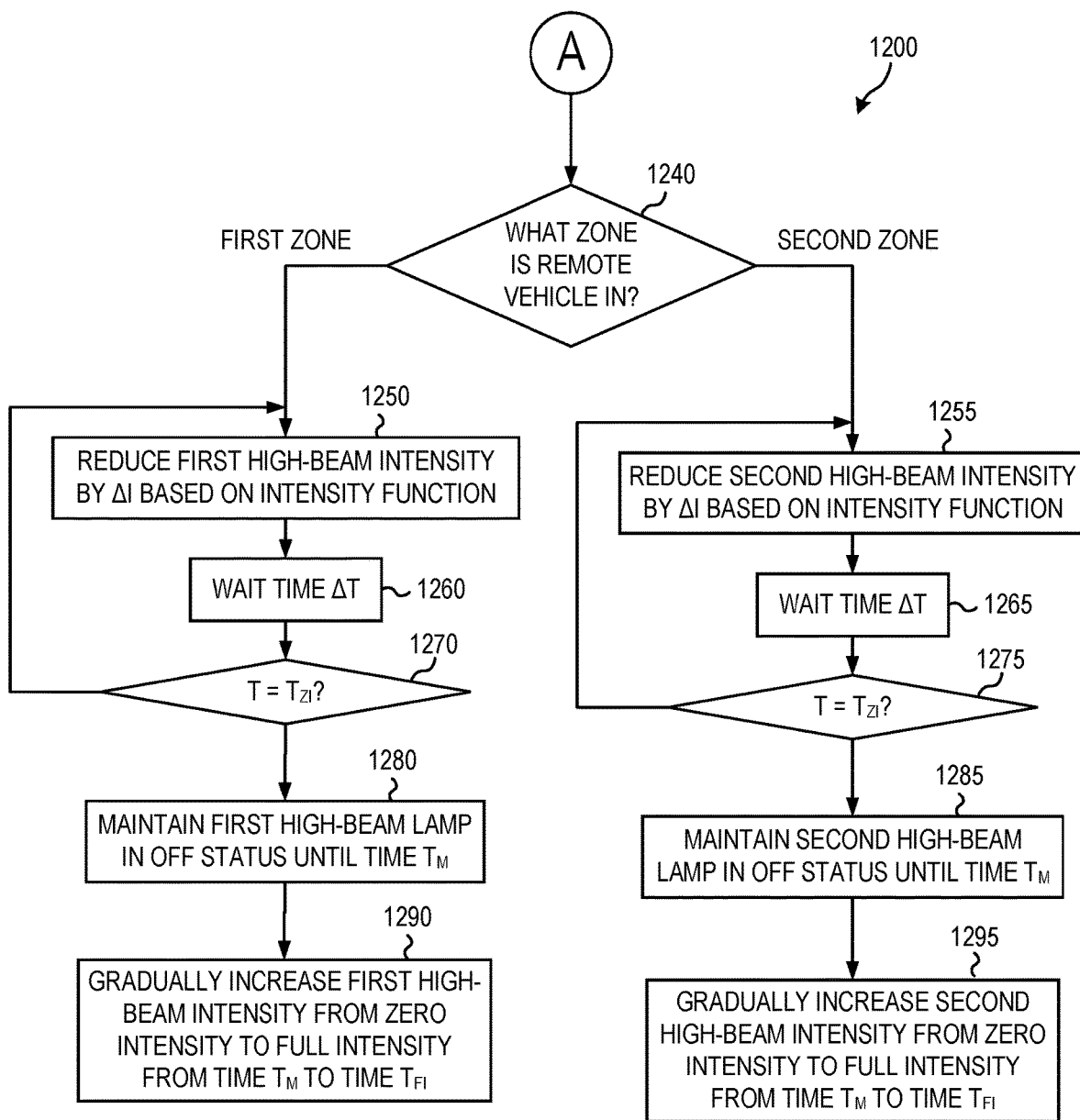

FIGS. 12A and 12B show a flowchart describing the operation of an adaptive driving beam (ADB) lighting system according to alternate disclosed embodiments. Operations with the same reference number in FIGS. 12A and 12B operate the same as described above with respect to the method of FIG. 11.

As shown in FIG. 12A, operation begins with activating a sensory cluster (1105).

First and second high-beam lamps are then turned on to shine high-beam light into first and second zones, respectively, in a light pattern field of view in front of the local vehicle (1210). In many embodiments full high-beam illumination is achieved by having a low-beam lamp shine low-beam light in the entire light pattern field of view and having the first and second high-beam lamps shine the high-beam light in the first and second zones of the light pattern field of view in addition to the low-beam light. The combination of the low-beam light and the high-beam light results in full high-beam illumination. In such embodiments the low-beam lamp will already be on when the high-beam lamp is activated or the low-beam lamp will be activated concurrently with the high-beam lamp.

The sensory cluster then operates to continually detect whether a remote vehicle enters a sensory cluster field of view in front of the local vehicle (1115) and in doing so determines whether a remote vehicle is detected (1120). The sensory cluster will also be able to identify in which of a plurality of zones the remote vehicle is located in a light pattern field of view in front of the local vehicle.

If no remote vehicle is detected, the system simply continues to use the sensory cluster to detect a remote vehicle (1110) and determine if a remote vehicle has been detected (1115).

If, however, a remote vehicle is detected, the lighting system then determines whether the remote vehicle is in a first zone or a second zone (1220). This can be accomplished based on sensory data gathered by the sensory cluster. It is also possible that the remote vehicle will be detected in both zones in some situations. For example, the remote vehicle could straddle the border between the first and second zone.

The lighting system then determines a distance from the local vehicle to the remote vehicle (1125) and determines a velocity of the remote vehicle with respect to the local vehicle (1130).

The lighting system then estimates a meeting time $T_M$ at which the remote vehicle will be at a minimum distance from the local vehicle based on the determined relative velocity of the remote vehicle with respect to the local vehicle and the distance from the remote vehicle to the local vehicle (1135).

The lighting system then determines a zero-intensity target time $T_{ZI}$ at which the intensity of the high-beam lamp should drop to zero (1140).

The lighting system then determines an intensity function for a high-beam lamp that starts at full intensity (or a current intensity if the high-beam lamp is not currently at full intensity) and drops to zero intensity at the zero-intensity target time $T_{ZI}$ (1145).

The lighting system then identifies which zone the remote vehicle is in (1240). If the remote vehicle is in both the first and the second zone, the method will simply pursue both the operations relating to the remote vehicle being in the first zone and the operations relating to the remote vehicle being in the second zone.

If the remote vehicle is determined to be in the first zone, the lighting system then reduces the intensity of the first high-beam lamp associated with the first zone by an incremental intensity ΔI based on the intensity function (1250). In some embodiments the incremental intensity ΔI will remain constant throughout the entire operation. In other embodiments the incremental intensity ΔI can be a dynamic value that is repeatedly adjusted during operation. If the incremental intensity ΔI is adjusted, it can be adjusted based on time, distance, relative speed, or any desirable measurement or variable, as well as a combination of such values.

After reducing the first high-beam intensity by the incremental intensity ΔI, the lighting system will wait a delay time ΔT (1260). This allows the sensory cluster to update the values for relative speed and distance.

After the delay time ΔT, the lighting system will determine whether the current time is equal to the zero-intensity target time $T_{ZI}$ (1170). The zero-intensity target time $T_{ZI}$ is the time at which the intensity of the high-beam lamp should be at zero intensity (i.e., off).

If the current time is not equal to the zero-intensity target time $T_{ZI}$, then the lighting system will again reduce the first high-beam intensity by the incremental intensity ΔI (1250), wait the delay time ΔT (1260), and determine whether the time is equal to the zero-intensity target time $T_{ZI}$ (1270). Although not explicitly stated, if the incremental intensity ΔI is a dynamic value, this operation can include updating the value for the incremental intensity ΔI.

If the current time is equal to the zero-intensity target time $T_{ZI}$, then the lighting system will maintain the first high-beam lamp in an off status until the meeting time $T_M$ (1280) and then gradually increase the first high-beam intensity from zero back to full intensity from the meeting time $T_M$ to a full-intensity time $T_{FI}$ after the meeting time $T_M$ (1290).

If the remote vehicle is determined to be in the second zone, the lighting system then reduces the intensity of the second high-beam lamp associated with the second zone by the incremental intensity ΔI (1255). In some embodiments the incremental intensity ΔI will remain constant throughout the entire operation. In other embodiments the incremental intensity ΔI can be a dynamic value that is repeatedly adjusted during operation. If the incremental intensity ΔI is adjusted, it can be adjusted based on time, distance, relative speed, or any desirable measurement or variable, as well as a combination of such values.

After reducing the second high-beam intensity by the incremental intensity ΔI, the lighting system will wait a delay time ΔT (1265). This allows the sensory cluster to update the values for relative speed and distance.

After the delay time ΔT, the lighting system will determine whether the current time is equal to the zero-intensity target time $T_{ZI}$ (1175).

If the current time is not equal to the zero-intensity target time $T_{ZI}$, then the lighting system will again reduce the second high-beam intensity by the incremental intensity ΔI (1255), wait the delay time ΔT (1265), and determine whether the time is equal to the zero-intensity target time $T_{ZI}$ (1275). Although not explicitly stated, if the incremental intensity ΔI is a dynamic value, this operation can include updating the value for the incremental intensity ΔI.

If the current time is equal to the zero-intensity target time $T_{ZI}$, then the lighting system will maintain the second high-beam lamp in an off status until the meeting time $T_M$ (1280) and then gradually increase the second high-beam intensity from zero back to full intensity from the meeting time $T_M$ to a full-intensity time $T_{FI}$ after the meeting time $T_M$ (1290).

In situations in which the remote vehicle is in both the first zone and the second zone, the operations of controlling the first high-beam intensity (1250, 1260, 1270, 1280, 1290) and operations of controlling the second high-beam intensity (1255, 1265, 1275, 1285, 1295) may be performed in parallel.

Although the method of FIGS. 12A and 12B discloses the use of two high-beam lamps shining light in two zones, this is by way of example only. Alternate embodiments can employ three or more high-beam lamps illuminating three or more associated zones.

Typically, the total number of zones used will cover the entire light pattern field of view. In different embodiments, these zones may overlap, or may each cover a unique area. Likewise, in different embodiments, the size of the zones may be uniform (i.e., each zone is the same size) or variable (i.e., different zones have different sizes).

If more than two zones are used for shining high-beam light, the operation of determining whether the remote vehicle is in a first zone or a second zone (1220) will be modified to determine which of the three or more zones the remote vehicle is it. Similarly, a process of controlling the high-beam intensity each additional zone will be added. These processes will be comparable to the disclosed processes for controlling the high-beam intensity in the first and second zones.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A lighting system for a local vehicle, comprising:
    a head lamp including
        a low-beam lamp configured to shine low-beam light in a first of zone adjacent to the local vehicle,
        a first high-beam lamp configured to shine first high-beam light in the first zone adjacent to the local vehicle, and
        a second high-beam lamp configured to shine second high-beam light in a second zone adjacent to the local vehicle, the second zone being different from the first zone;
    a sensory cluster configured to detect a remote vehicle proximate to the local vehicle, the sensory cluster including
        a distance sensor configured to determine a distance of the remote vehicle from the local vehicle, and
        a velocity sensor configured to determine a velocity of the remote vehicle with respect to the local vehicle; and
    a lighting controller configured to determine a minimum-distance target time when the remote vehicle will reach a minimum distance from the local vehicle based on the distance of the remote vehicle and the velocity of the remote vehicle, and configured to control the operation of the first high-beam lamp based on the distance of the remote vehicle and the velocity of the remote vehicle,
    wherein
    the sensory cluster is further configured to determine an identified zone from the first and second zones in which the remote vehicle is located, and
    the lighting controller is further configured to control the operation of the first and second high-beam lamps based on the minimum-distance time and the target zone, and the identified zone.

2. The lighting system of claim 1, wherein the lighting controller is further configured to
incrementally reduce a first light intensity of the first high-beam lamp from a maximum intensity to zero intensity from a detection time at which the sensory cluster detects the remote vehicle to an off-time prior to the minimum-distance time, and
maintain a second light intensity of the second high-beam lamp at a maximum intensity.

3. The lighting system of claim 1, further comprising
a first lens configured to pass the first high-beam light from the first high-beam lamp to the first zone; and
a second lens configured to pass the second high-beam light from the second high-beam lamp to the second zone,
wherein
each of the first and second lenses is configured to selectively and independently alter its light transmissivity to between 0% and 100%, and
the lighting controller is further configured to individually control the light transmissivity of the first and second lenses based on the minimum-distance time, the target zone, and the identified zone.

4. A method of controlling a lighting system for a local vehicle, comprising:
turning on a first high-beam lamp in the local vehicle, the first high beam shining a first high-beam light into a first zone adjacent to the local vehicle;
detecting a remote vehicle proximate to the local vehicle at a detection time;
determining a distance between the local vehicle and the remote vehicle;
determining a velocity of the remote vehicle with respect to the local vehicle;
estimating a minimum-distance time when the remote vehicle will be at a minimum distance from the local vehicle using the distance between the local vehicle and the remote vehicle and velocity of the remote vehicle with respect to the local vehicle;
determining a zero-intensity time that is before the minimum-distance time;
determining an intensity function that starts at full intensity at the detection time and drops to zero intensity at the zero-intensity time based on the distance between the local vehicle and the remote vehicle and the velocity of the remote vehicle;
incrementally reducing a first light intensity of the first high-beam lamp based on the intensity function from when the intensity function is determined to the zero-intensity time based on the intensity function, and
maintaining the first light intensity of the first high-beam lamp at zero intensity from the zero-intensity time to the minimum-distance time.

5. The method of claim 4, further comprising:
incrementally increasing the first light intensity of the first high-beam lamp from the zero intensity to the maximum intensity from the minimum-distance time to a maximum-intensity time after the minimum-distance time.

6. The method of claim 4, further comprising:
turning on a second high-beam lamp in the local vehicle after turning on the first high-beam lamp, the second high beam shining a second high-beam light into a second zone adjacent to the local vehicle, the second zone being different from the first zone;
determining that the remote vehicle is located in the first zone after detecting the remote vehicle; and
maintaining a second light intensity of the second high-beam lamp at full intensity from the detection time to the minimum-distance time.

7. The method of claim 4, further comprising:
turning on a low-beam lamp to shine a low-beam light in the first zone before turning on the first high-beam lamp.

8. The method of claim 7, wherein
the low-beam lamp shines the low beam light at a first angle below vertical,
the first high-beam lamp shines the first high-beam light at a second angle below vertical, and
the first angle is greater than the second angle.

9. The method of claim 7, wherein
the operations of detecting the remote vehicle, determining the distance between the local vehicle and the remote vehicle, and determining the velocity of the remote vehicle are performed using at least one of camera data, LiDAR data, radar data, or sonar data.

* * * * *